US010088628B1

(12) United States Patent
Oonawa et al.

(10) Patent No.: US 10,088,628 B1
(45) Date of Patent: Oct. 2, 2018

(54) OPTICAL WAVEGUIDE ELEMENT AND RECEIVING CIRCUIT

(71) Applicants: Oki Electric Industry Co., Ltd., Tokyo (JP); Photonics Electronics Technology Research Association, Tokyo (JP)

(72) Inventors: Yousuke Oonawa, Tokyo (JP); Hideaki Okayama, Tokyo (JP)

(73) Assignees: Oki Electric Industry Co., Ltd., Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/838,447

(22) Filed: Dec. 12, 2017

(30) Foreign Application Priority Data

Mar. 16, 2017 (JP) .................................. 2017-051385

(51) Int. Cl.
*G02B 6/00* (2006.01)
*G02B 6/126* (2006.01)
*G02B 6/12* (2006.01)

(52) U.S. Cl.
CPC .......... *G02B 6/126* (2013.01); *G02B 6/12004* (2013.01); *G02B 2006/12097* (2013.01);
(Continued)

(58) Field of Classification Search
CPC ................ G02B 6/126; G02B 6/12004; G02B 2006/12097; G02B 2006/12104; G02B 2006/12107
See application file for complete search history.

(56) References Cited

U.S. PATENT DOCUMENTS 4,978,187 A * 12/1990 Minemura ............... G01P 3/486
385/14
5,285,274 A * 2/1994 Tanno .................... G11B 7/005
347/241
(Continued)

FOREIGN PATENT DOCUMENTS

JP H06-201942 A 7/1994
JP 2009-244326 A 10/2009
(Continued)

OTHER PUBLICATIONS

Tai Tsuchizawa et al., "Microphotonics Devices Based on Silicon Microfabrication Technology", IEEE Journal of Selected Topics in Quantum Electronics, vol. 11, No. 1, pp. 232-240, Jan./Feb. 2005.
(Continued)

*Primary Examiner* — Ellen Kim
(74) *Attorney, Agent, or Firm* — Rabin & Berdo, P.C.

(57) ABSTRACT

The optical waveguide element has a first optical waveguide core; and a second optical waveguide core. In the optical waveguide element, the first optical waveguide core includes a first coupling portion configured to propagate any one polarized wave of a TE polarized wave and a TM polarized wave of a $k^{th}$-order mode, the other polarized wave of an $h^{th}$-order mode, and the other polarized wave of a $p^{th}$-order mode, and a first Bragg reflector connected to the first coupling portion. The second optical waveguide core includes a second coupling portion. The first Bragg reflector includes a rib waveguide including a grating configured to convert the one input polarized wave of the $k^{th}$-order mode into the other polarized wave of the $h^{th}$-order mode, reflect the converted polarized wave on the basis of Bragg reflection, and transmit the other input polarized wave of the $p^{th}$-order mode, and slab waveguides having thicknesses smaller than that of the rib waveguide and integrally formed
(Continued)

with the rib waveguide on both side surfaces of the rib waveguide respectively, in the light propagation direction.

10 Claims, 18 Drawing Sheets

(52) U.S. Cl.
CPC .............. *G02B 2006/12104* (2013.01); *G02B 2006/12107* (2013.01)

(56) References Cited

U.S. PATENT DOCUMENTS

| | | | |
|---|---|---|---|
| 5,379,142 A | 1/1995 | Handa | |
| 9,823,418 B2 * | 11/2017 | Okayama | G02B 6/29397 |
| 2004/0258358 A1 * | 12/2004 | Duguay | G02B 6/122 |
| | | | 385/39 |
| 2011/0053095 A1 * | 3/2011 | Sakuma | G02B 6/124 |
| | | | 430/321 |
| 2015/0381301 A1 | 12/2015 | Jeong | |
| 2018/0059327 A1 * | 3/2018 | Sakamoto | G02B 6/29325 |
| 2018/0088275 A1 * | 3/2018 | Okayama | G02B 6/12007 |

FOREIGN PATENT DOCUMENTS

| | | |
|---|---|---|
| JP | 2011-070177 A | 4/2011 |
| JP | 2016-024298 A | 2/2016 |
| WO | WO 2014-147821 A1 | 9/2014 |

OTHER PUBLICATIONS

Hirohito Yamada et al., "Si Photonic Wire Waveguide Devices", IEEE Journal of Selected Topics in Quantum Electronics, vol. 12, No. 6, pp. 1371-1379, Nov./Dec. 2006.

* cited by examiner

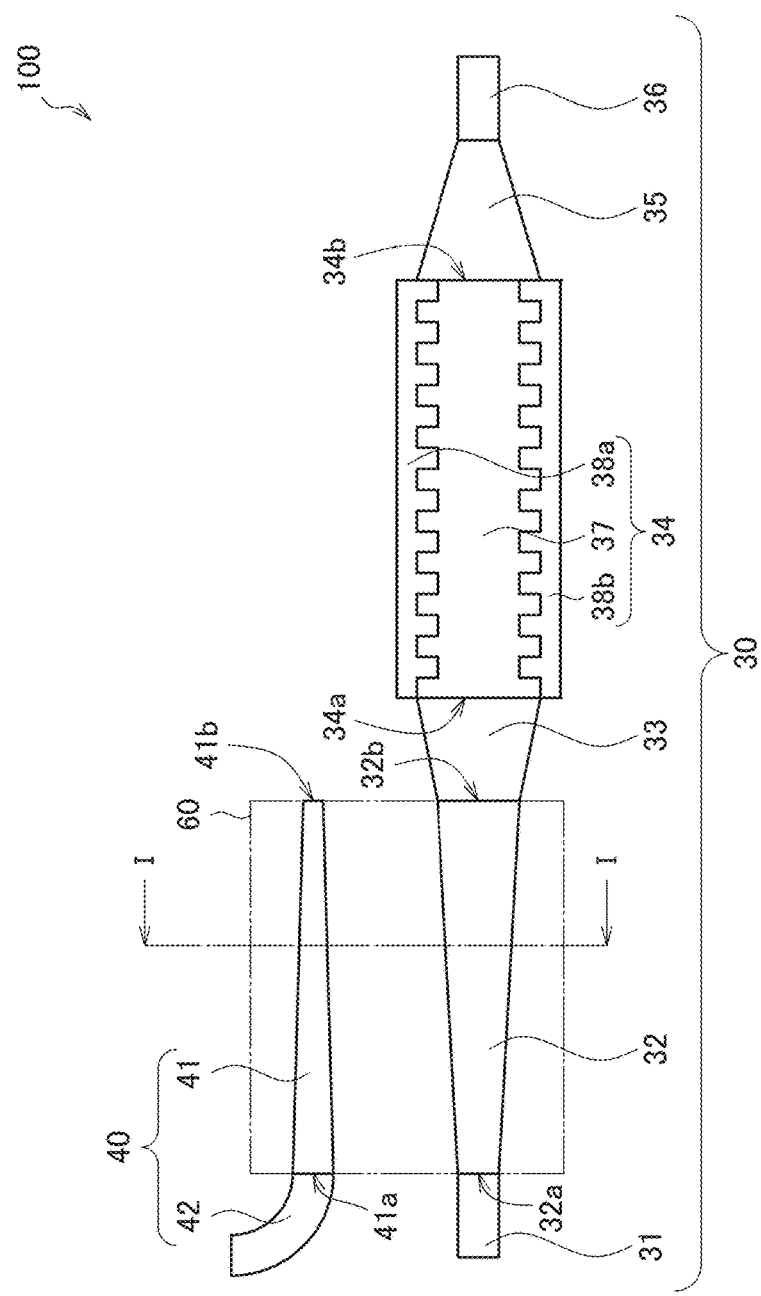

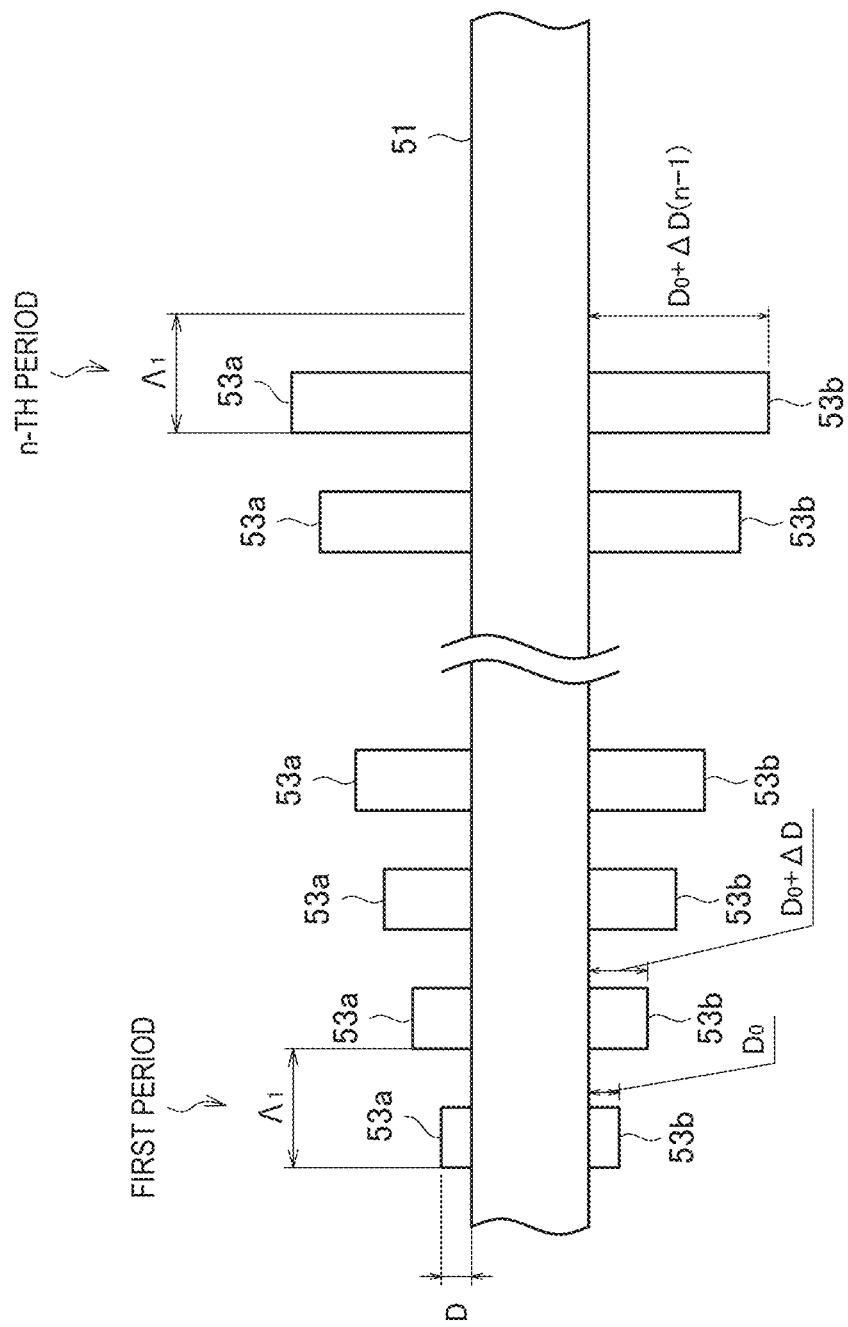

OPTICAL WAVEGUIDE ELEMENT AND RECEIVING CIRCUIT

CROSS REFERENCE TO RELATED APPLICATION(S)

This application is based upon and claims benefit of priority from Japanese Patent Application No. 2017-051385, filed on Mar. 16, 2017, the entire contents of which are incorporated herein by reference.

BACKGROUND

The present invention relates to an optical waveguide element for switching a path between a transverse electric (TE) polarized wave and a transverse magnetic (TM) polarized wave, and a receiving circuit including the optical waveguide element.

Along with the increase in information transmission amount, an optical wiring technology is gaining attention. In an optical wiring technology, information is transmitted between devices, boards, chips, or the like in an information processing device through optical signals by using an optical device using an optical fiber or an optical waveguide as a transmission medium. As a result, it is possible to improve a bandwidth limitation of an electrical wiring, which is a bottleneck in an information processing device which requests high-speed signal processing.

Optical devices have optical elements such as optical transmitters and optical receivers. These optical elements can be spatially coupled with each other using, for example, a lens after performing a complicated optical axis alignment for aligning the center position (light receiving position or light emitting position) of each optical element with the design position.

As a means for coupling each optical element, there is a technology of using an optical waveguide element instead of a lens. In the case of using the optical waveguide element, because light is confined within the optical waveguide and propagates, unlike the case of using the lens, complicated optical axis alignment is not necessary. Therefore, because an assembling process of an optical device is simplified, it is advantageous as a form suitable for mass production.

In the optical waveguide element, for example, silicon (Si) can be used as a waveguide material. In an optical waveguide element (Si waveguide) using Si as a material, an optical waveguide core, which substantially serves as a light transmission path, is formed using Si as a material. Then, surroundings of the optical waveguide core are covered by a cladding formed of, for example, silicon oxide ($SiO_2$) or the like having a lower refractive index than Si. With such a configuration, because a difference in refractive index between the optical waveguide core and the cladding becomes extremely large, it is possible to strongly confine light in the optical waveguide core. As a result, it is possible to realize a small curved waveguide in which a bending radius is reduced to about several µm, for example. Therefore, it is possible to prepare an optical circuit having the size similar to an electronic circuit, and it is advantageous for reducing the entire size of the optical device.

In addition, when using the Si waveguide, mass production of an optical device in which elements having various functions are monolithically integrated on the same substrate is possible by applying a manufacturing process of a complementary metal oxide semiconductor (CMOS). Therefore, the optical device using the Si waveguide is advantageous for size reduction and cost reduction (refer to, for example, Non-patent Document 1 (IEEE Journal of selected topics quantum electronics, vol. 11, 2005 p. 232-240) and Non-patent Document 2 (IEEE Journal of selected topics quantum electronics, vol. 12, No. 6, November/December 2006 p. 1371-1379)).

On the other hand, in the Si waveguide, due to a large difference in relative refractive index between the core and the cladding, a difference in equivalent refractive index in a waveguide mode and a difference in group index tend to be large between a TE polarized wave and a TM polarized wave. Therefore, the Si waveguide has a polarization dependency.

Therefore, in a wavelength filter such as a Mach-Zehnder interferometer, a ring resonator, a grating, and an arrayed waveguide grating (AWG) constituted by a Si waveguide, a deviation of wavelength response characteristics between both polarized waves becomes large even at the same wavelength. Such a deviation of the characteristics becomes a cause of inter-channel crosstalk in a reception-side device or the like in a fiber transmission system, for example.

A light receiving element using the Si waveguide is formed by depositing a light absorption layer such as germanium (Ge) on the Si waveguide. A magnitude of a photocurrent converted by the light receiving element varies depending on polarized waves.

To eliminate the polarization dependency in the Si waveguide, there is a system in which a band-pass filter for a TE polarized wave and a band-pass filter for a TM polarized wave that extract the same wavelength are separately prepared (refer to, for example, Patent Document 1 (JP H6-201942A)). In this system, the band-pass filters for the TE polarized wave and the TM polarized wave are connected in parallel or in series. Then, the TE polarized wave and the TM polarized wave extracted from the band-pass filters are multiplexed by a polarization multiplexer. Therefore, the system of Patent Document 1 functions as a wavelength filter capable of extracting a specific wavelength without depending on polarized waves.

However, in the system of Patent Document 1, the TE polarized wave and the TM polarized wave are included in the light multiplexed by the polarization multiplexer. Therefore, even when, for example, a light receiving element is installed at a rear stage of the system, the above-described polarization dependency (in other words, variation in magnitudes of a photocurrent) remains in the light receiving element.

As another structure for eliminating the polarization dependency in the Si waveguide, there is a structure in which a polarization separating element and a polarization rotating element are provided at a front stage of a wavelength filter (refer to, for example, Patent Document 2 (JP 2009-244326A)).

In the structure of Patent Document 2, first, light is separated into a TE polarized wave and a TM polarized wave orthogonal to each other by the polarization separating element. Next, one of the polarized waves is rotated 90° by the polarization rotating element. As a result, light input to the wavelength filter is aligned to either the TE polarized wave or the TM polarized wave. Therefore, design of the wavelength filter is necessary only for either the TE polarized wave or the TM polarized wave, and the polarization dependency is eliminated. When the structure of Patent Document 2 is used, because light can be aligned to either the TE polarized wave or the TM polarized wave, the above-described polarization dependency in the light receiving element can be eliminated.

The polarization separating element can be constituted by, for example, using a directional coupler having two Si waveguides arranged next to each other. In the polarization separating element using the directional coupler, a core of the Si waveguide is formed to have a flat cross-sectional shape. This generates a difference in coupling action length of the directional coupler with respect to the TE polarized wave and the TM polarized wave. As a result, the TE polarized wave and the TM polarized wave can be output through different paths.

The polarization rotating element has a so-called eccentric double core structure in which two optical waveguide cores having different refractive indexes are overlapped. In this structure, an upper optical waveguide core having a smaller refractive index than a lower optical waveguide core is formed on the lower optical waveguide core. The upper optical waveguide core is covered with a cladding having a smaller refractive index than the upper optical waveguide core. As a result, an optical waveguide element in which a propagation center of light with respect to the lower optical waveguide core and a propagation center of light with respect to the upper optical waveguide core do not coincide with each other is constituted. In the polarization rotating element having the eccentric double core structure, an arbitrary rotation amount can be given to light propagating at a predetermined distance.

SUMMARY

However, the polarization separating element using the directional coupler is susceptible to manufacturing error (that is, the manufacturing tolerance is small). For example, when an error occurs in the width of the two Si waveguides constituting the directional coupler, the coupling efficiency between the Si waveguides deteriorates. As a result, the TE polarized wave and the TM polarized wave cannot be separated completely, and there is a risk that, in a path through which one polarized wave is to be output, the other polarized wave may be mixed.

In the polarization rotating element having the eccentric double core structure, two optical waveguide cores having different refractive indexes have to be formed. Therefore, it is necessary to perform at least two optical waveguide core forming processes during the manufacture. Further, to give a designed rotation amount to light, it is necessary to process and adjust an amount of eccentricity between the lower optical waveguide core and the upper optical waveguide core with high accuracy.

In view of the above circumstances, as an optical waveguide element for eliminating polarization dependency, an optical waveguide element that has a polarization separating function and a polarization rotating function, is less susceptible to manufacturing error, and can be easily manufactured, and a receiving circuit including the optical waveguide element is desired.

According to an embodiment of the present invention, a first optical waveguide element includes: a first optical waveguide core; and a second optical waveguide core. The first optical waveguide core includes a first coupling portion configured to propagate any one polarized wave of a TE polarized wave and a TM polarized wave of a $k^{th}$-order mode (k is an integer equal to or larger than 0), the other polarized wave of an $h^{th}$-order mode (h is an integer equal to or larger than 0), and the other polarized wave of a $p^{th}$-order mode (p is an integer equal to or larger than 0 that is different from h), and a first Bragg reflector connected to the first coupling portion. The second optical waveguide core includes a second coupling portion. The first Bragg reflector includes a rib waveguide including a grating configured to convert the one input polarized wave of the $k^{th}$-order mode into the other polarized wave of the $h^{th}$-order mode, reflect the converted polarized wave on the basis of Bragg reflection, and transmit the other input polarized wave of the $p^{th}$-order mode, and slab waveguides having thicknesses smaller than that of the rib waveguide and integrally formed with the rib waveguide on both side surfaces of the rib waveguide respectively, in the light propagation direction. A first coupling region in which the first coupling portion and the second coupling portion are spaced apart from each other and arranged in parallel to each other is provided. In the first coupling region, the other polarized wave of the $h^{th}$-order mode propagating through the first coupling portion and the other polarized wave of an $m^{th}$-order mode (m is an integer equal to or larger than 0) propagating through the second coupling portion are coupled.

In addition to the first optical waveguide element, a second optical waveguide element according to an embodiment of the present invention further includes: a third optical waveguide core; and a fourth optical waveguide core. The third optical waveguide core includes a third coupling portion configured to propagate any one polarized wave of a TE polarized wave and a TM polarized wave of a $k^{th}$-order mode (k is an integer equal to or larger than 0), the other polarized wave of a $p^{th}$-order mode (p is an integer equal to or larger than 0), and the other polarized wave of a $q^{th}$-order mode (q is an integer equal to or larger than 0 that is different from p), and a second Bragg reflector connected to the third coupling portion. The fourth optical waveguide core includes a fourth coupling portion. The second Bragg reflector includes a grating configured to convert the other input polarized wave of the $p^{th}$-order mode into the other polarized wave of the $q^{th}$-order mode, reflect the converted polarized wave on the basis of Bragg reflection, and transmit the one input polarized wave. A second coupling region in which the third coupling portion and the fourth coupling portion are spaced apart from each other and arranged in parallel to each other is provided. In the second coupling region, the other polarized wave of the $q^{th}$-order mode propagating through the third coupling portion and the other polarized wave of an $r^{th}$-order mode (r is an integer equal to or larger than 0) propagating through the fourth coupling portion are coupled. A side of the second Bragg reflector opposite to a side connected to the third coupling portion and a side of the first coupling portion opposite to a side connected to the first Bragg reflector are connected.

In addition, according to an embodiment of the present invention, a first receiving circuit includes: the first optical waveguide element described above; a front-stage connection waveguide core; a wavelength filter portion; a rear-stage connection waveguide core; and a light receiving element. The front-stage connection waveguide core is connected, at one end, to a side of the Bragg reflector opposite to a side connected to the first coupling portion and is connected, at the other end, to the second coupling portion. The other polarized wave passing through the Bragg reflector is input to the one end of the front-stage connection waveguide core, and the other polarized wave propagating through the second coupling portion is input to the other end of the front-stage connection waveguide core. The wavelength filter portion extracts the other polarized wave of a specific wavelength from the other polarized wave propagating through the front-stage connection waveguide core and sends the extracted polarized wave to the rear-stage connection waveguide core. The rear-stage connection waveguide core sends the other polarized wave of the specific wavelength sent from the wavelength filter portion to the light receiving element.

In addition, according to an embodiment of the present invention, a second receiving circuit includes: the second optical waveguide element described above; a front-stage connection waveguide core; a wavelength filter portion; a rear-stage connection waveguide core; and a light receiving element. The front-stage connection waveguide core is connected, at one end, to the second coupling portion and is connected, at the other end, to the fourth connecting portion. The other polarized wave propagating through the second coupling portion is input from one end of the front-stage connection waveguide core, and the other polarized wave propagating through the fourth coupling portion is input from the other end of the front-stage connection waveguide core. The wavelength filter portion extracts the other polarized wave of a specific wavelength from the other polarized wave propagating through the front-stage connection waveguide core and sends the extracted polarized wave to the rear-stage connection waveguide core. The rear-stage connection waveguide core sends the other polarized wave of the specific wavelength sent from the wavelength filter portion to the light receiving element.

In addition, according to an embodiment of the present invention, a third receiving circuit includes: the first optical waveguide element described above; a first front-stage connection waveguide core; a second front-stage connection waveguide core; a first wavelength filter portion; a second wavelength filter portion; a first rear-stage connection waveguide core; a second rear-stage connection waveguide core; and a light receiving element. The first front-stage connection waveguide core is connected to a side of the Bragg reflector opposite to a side connected to the first coupling portion. The other polarized wave passing through the Bragg reflector is input to the first front-stage connection waveguide core. The second front-stage connection waveguide core is connected to the second coupling portion. The other polarized wave propagating through the second coupling portion is input to the second front-stage connection waveguide core. The first wavelength filter portion extracts the other polarized wave of a specific wavelength from the other polarized wave propagating through the first front-stage connection waveguide core and sends the extracted polarized wave to the first rear-stage connection waveguide core. The second wavelength filter portion extracts the other polarized wave of a specific wavelength from the other polarized wave propagating through the second front-stage connection waveguide core and sends the extracted polarized wave to the second rear-stage connection waveguide core. The first rear-stage connection waveguide core sends the other polarized wave of the specific wavelength sent from the first wavelength filter portion to the light receiving element. The second rear-stage connection waveguide core sends the other polarized wave of the specific wavelength sent from the second wavelength filter portion to the light receiving element.

In addition, according to an embodiment of the present invention, a fourth receiving circuit includes: the second optical waveguide element described above; a first front-stage connection waveguide core; a second front-stage connection waveguide core; a first wavelength filter portion; a second wavelength filter portion; a first rear-stage connection waveguide core; a second rear-stage connection waveguide core; and a light receiving element. The first front-stage connection waveguide core is connected to the second coupling portion. The other polarized wave propagating through the second coupling portion is input to the first front-stage connection waveguide core. The second front-stage connection waveguide core is connected to the fourth coupling portion. The other polarized wave propagating through the fourth coupling portion is input to the second front-stage connection waveguide core. The first wavelength filter portion extracts the other polarized wave of a specific wavelength from the other polarized wave propagating through the first front-stage connection waveguide core and sends the extracted polarized wave to the first rear-stage connection waveguide core. The second wavelength filter portion extracts the other polarized wave of a specific wavelength from the other polarized wave propagating through the second front-stage connection waveguide core and sends the extracted polarized wave to the second rear-stage connection waveguide core. The first rear-stage connection waveguide core sends the other polarized wave of the specific wavelength sent from the first wavelength filter portion to the light receiving element. The second rear-stage connection waveguide core sends the other polarized wave of the specific wavelength sent from the second wavelength filter portion to the light receiving element.

In the optical waveguide element according to an embodiment of the present invention, because a Bragg reflector includes a rib waveguide and a slab waveguide, an electric filed distribution of light propagating through the Bragg reflector becomes eccentric in a thickness direction and becomes asymmetric vertically. As a result, in a grating formed at the Bragg reflector, it is possible to convert one input polarized wave into the other polarized wave, reflect the converted polarized wave on the basis of Bragg reflection, and transmit the other input polarized wave. Therefore, output light can be aligned to either a TE polarized wave or a TM polarized wave. Therefore, the optical waveguide element according to the embodiment of the invention can be used instead of the conventional polarization separating element and polarization rotating element.

The Bragg reflector substantially having a polarization separation function and a polarization rotating function does not include a directional coupler and does not have to form two optical waveguide cores having different refractive indexes. Therefore, the optical waveguide element and a receiving circuit having the optical waveguide element according to the embodiment of the invention are less susceptible to manufacturing error and can be easily manufactured.

BRIEF DESCRIPTION OF THE DRAWINGS

FIG. 1A is a schematic plan view illustrating a first optical waveguide element according to an embodiment of the present invention;

FIG. 3 is a schematic plan view illustrating a modified example of a grating;

DETAILED DESCRIPTION OF THE EMBODIMENT(S)

Figure 1B:
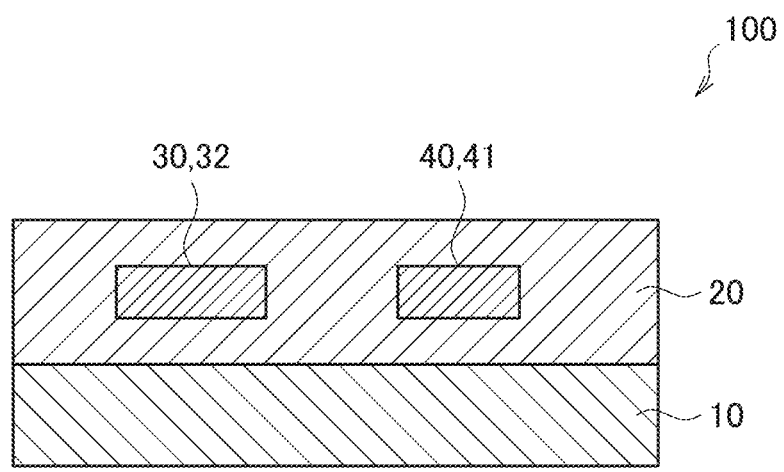
FIG. 1B is a schematic end view of the structure illustrated in FIG. 1A taken along the line I-I.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(First Optical Waveguide Element)

An optical waveguide element (hereinafter also referred to as a first optical waveguide element) according to a first embodiment of the present invention will be described with reference to FIGS. 1A and 1B. FIG. 1A is a schematic plan view illustrating the first optical waveguide element. In FIG. 1A, a support substrate and a cladding, which will be described below, are omitted. FIG. 1B is a schematic end view of the structure illustrated in FIG. 1A taken along the line I-I.

In the following description, for each component, a direction along a light propagation direction is defined as a longitudinal direction. In addition, a direction along a thickness of the support substrate is defined as a thickness direction. In addition, a direction orthogonal to the longitudinal direction and the thickness direction is defined as a width direction.

A first optical waveguide element 100 has a support substrate 10, a cladding 20, a first optical waveguide core 30, and a second optical waveguide core 40. The first optical waveguide core 30 has a first port portion 31, a first coupling portion 32, a first connecting portion 33, a Bragg reflector 34, a second connecting portion 35, and a second port portion 36 which are connected in series. The second optical waveguide core 40 has a second coupling portion 41 and a third port portion 42 which are connected in series. Further, a coupling region 60 in which the first coupling portion 32 and the second coupling portion 41 are spaced apart from each other and arranged in parallel to each other is set.

The first optical waveguide element 100 is used, for example, as an element for outputting an input optical signal in alignment with one of a transverse electric (TE) polarized wave and a transverse magnetic (TM) polarized wave. Here, as an example, a configuration example in which an optical signal of a fundamental mode ($0^{th}$-order mode) including a TE polarized wave and a TM polarized wave is input from the first port portion 31, the TE polarized wave of the fundamental mode is not subjected to polarization conversion and is output from the second port portion 36, and the TM polarized wave of the fundamental mode is converted into the TE polarized wave of the fundamental mode and is output from the third port portion 42 will be described.

In this example, the optical signal including the TE polarized wave or the TM polarized wave of the fundamental mode is input to the first port portion 31 of the first optical waveguide core 30 and is sent to the Bragg reflector 34 via the first coupling portion 32 and the first connecting portion 33. In a grating formed in the Bragg reflector 34, the TM polarized wave of the fundamental mode included in the optical signal is converted into the TE polarized wave of the first-order mode, is Bragg reflected, and is sent again to the first coupling portion 32 via the first connecting portion 33. The TE polarized wave of the fundamental mode that is included in the optical signal and sent from the first connecting portion 33 is not subjected to mode conversion and polarization conversion and is output from the second port portion 36 via the Bragg reflector 34. The TE polarized wave of the first-order mode reflected by the grating of the Bragg reflector 34 and propagating through the first coupling portion 32 is converted into the TE polarized wave of the fundamental mode in the coupling region 60 and sent to the second coupling portion 41 of the second optical waveguide core 40. The TE polarized wave of the fundamental mode sent to the second coupling portion 41 is output from the third port portion 42.

The support substrate 10 is formed of, for example, a flat plate made of single crystal Si.

The cladding 20 is formed on the support substrate 10 to cover an upper surface of the support substrate 10 and includes the first optical waveguide core 30 and the second optical waveguide core 40. The cladding 20 is made of, for example, $SiO_2$.

The first optical waveguide core 30 is made of, for example, Si having a higher refractive index than the cladding 20. As a result, the first optical waveguide core 30 functions as a light transmission path, and light input to the first optical waveguide core 30 propagates in a propagation direction corresponding to a planar shape of the first optical waveguide core 30.

Like the first optical waveguide core 30, the second optical waveguide core 40 is made of, for example, Si having a higher refractive index than the cladding 20. As a result, the second optical waveguide core 40 functions as a light transmission path, and light input to the second optical waveguide core 40 propagates in a propagation direction corresponding to a planar shape of the second optical waveguide core 40.

To prevent propagating light from escaping to the support substrate 10, it is preferable that the first optical waveguide core 30 and the second optical waveguide core 40 be formed, for example, to be spaced at least 3 μm or more apart from the support substrate 10.

The first port portion 31 is formed with a thickness and a width to achieve a single mode condition for both the TE polarized wave and the TM polarized wave. Therefore, the first port portion 31 propagates the TE polarized wave and the TM polarized wave of the fundamental mode.

The first coupling portion 32 is connected to the first port portion 31 at one end 32a and is connected to the first connecting portion 33 at the other end 32b. The geometrical design of the first coupling portion 32 will be described below.

The first connecting portion 33 connects the first coupling portion 32 and the Bragg reflector 34. The width of the first connecting portion 33 is set to continuously change from a width of the other end 32b of the first coupling portion 32 to a width of a rib waveguide 37 at one end 34a of the Bragg reflector 34 in a light propagation direction. Reflection of light propagating between the first coupling portion 32 and the Bragg reflector 34 can be alleviated by providing the first connecting portion 33.

Figure 2A:
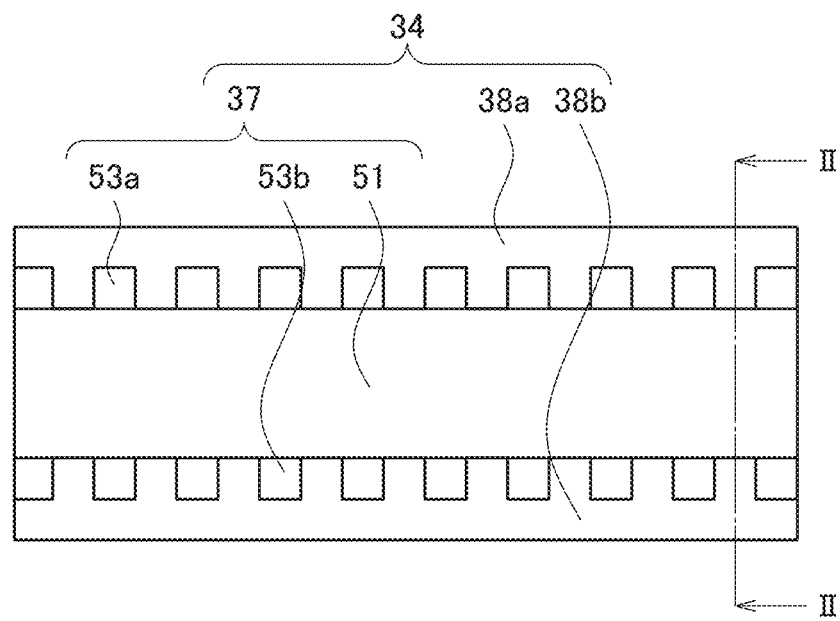
FIG. 2A is a schematic plan view illustrating a Bragg reflector.
Figure 2B:
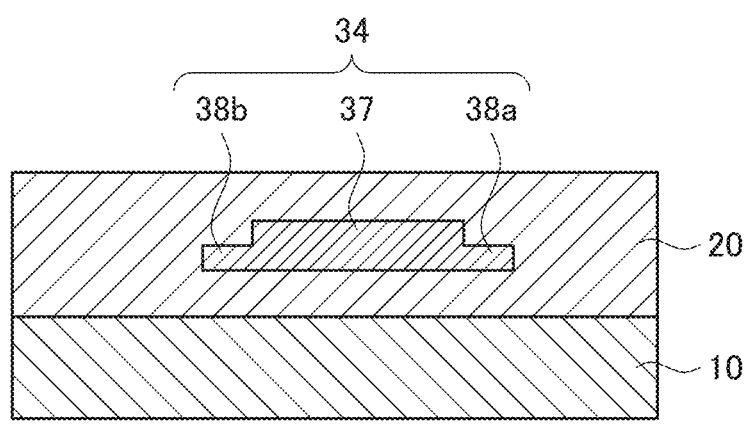
FIG. 2B is a schematic end view of the structure illustrated in FIG. 2A taken along the line II-II.

The Bragg reflector 34 includes the rib waveguide 37 and slab waveguides 38a and 38b. The Bragg reflector 34 will be described with reference to FIGS. 2A and 2B. FIG. 2A is a schematic plan view for describing the Bragg reflector 34. In FIG. 2A, the support substrate and the cladding are omitted. FIG. 2B is a schematic end view of the structure illustrated in FIG. 2A taken along the line II-II.

A grating is formed in the rib waveguide 37. The grating integrally includes a base 51 and protrusions 53a and 53b. The base 51 has a constant width and extends in the light propagation direction. Pluralities of protrusions 53a are periodically formed at one side surface of the base 51. Pluralities of protrusions 53b are formed on the other side surface of the base 51 at the same period as the protrusions 53a. The protrusions 53a and 53b are formed symmetrically with respect to the base 51 interposed therebetween.

In the grating according to the present embodiment, an input TM polarized wave of a predetermined wavelength is converted from the fundamental mode to the first-order mode, converted into the TE polarized wave, and reflected on the basis of Bragg reflection. Also, an input TE polarized wave of the fundamental mode is transmitted through the grating.

Conditions for a TM polarized wave having a wavelength $\lambda_1$ to be subjected to conversion from the fundamental mode to the first-order mode, conversion into the TE polarized wave, and Bragg reflection are shown by Equation (1) below in which $N_{TM0}$ is an equivalent refractive index of the fundamental mode of the TM polarized wave, $N_{TE1}$ is an equivalent refractive index of the first-order mode of the TE polarized wave, and $\Lambda_1$ is a grating period (the period in which the protrusions 53a and 53b are formed).

$$(N_{TM0} + N_{TE1})\Lambda_1 = \lambda_1 \quad (1)$$

Here, as a modified example of the grating, the period $\Lambda_1$ may be set to be constant, and protrusion amounts D of the protrusions 53a and 53b may be changed every period. The modified example of the grating will be described with reference to FIG. 3. FIG. 3 is a schematic plan view illustrating a modified example of the grating. In FIG. 3, only the rib waveguide of the Bragg reflector is illustrated, and the support substrate, the cladding, and the slab waveguides are omitted.

In the configuration example illustrated in FIG. 3, the protrusion amounts D of the protrusions 53a and 53b (dimensions of the protrusions 53a and 53b in the width direction) have unique protrusion amounts, and the protrusion amount D include two or more values. Here, the protrusion amount increases by $\Delta D$ every period with a constant amount of change with respect to the protrusion amount $D=D_0$ of the protrusions 53a and 53b in the first period. Therefore, in an n-th period, the protrusion amount D of the protrusions 53a and 53b is $D_0 + \Delta D(n-1)$.

As the protrusion amount D of the protrusions 53a and 53b changes, the Bragg wavelength $\lambda$ that satisfies Equation (1) above changes, and the equivalent refractive index changes accordingly. Therefore, by changing the protrusion amount D, a wavelength band (Bragg reflection band) capable of being reflected on the basis of Bragg reflection in the grating can be expanded.

The shift amount $\Delta\lambda$ of the Bragg wavelength for each period can be approximated by the following Equation (2) using the amount of change $\Delta D$ of the protrusion amount D. Note that, $N_0$ indicates the equivalent refractive index of the fundamental mode, and $N_1$ indicates the equivalent refractive index of the first-order mode. Because this embodiment is the configuration example in which the grating converts the TM polarized wave of the fundamental mode into the TE polarized wave of the first-order mode and reflects the converted polarized wave on the basis of Bragg reflection, $N_0$ corresponds to the equivalent refractive index of the fundamental mode of the TM polarized wave, and $N_1$ corresponds to the equivalent refractive index of the first-order mode of the TE polarized wave.

$$\Delta\lambda \approx \frac{\Lambda \frac{\partial(N_0 + N_1)}{\partial D_0} \Delta D}{1 - \Lambda \frac{\partial(N_0 + N_1)}{\partial \lambda}} \quad (2)$$

By adjusting $\Delta D$ and setting $\Delta\lambda$ such that Bragg wavelengths of periods overlap, the Bragg reflection band can be expanded. For example, in a case in which a grating of n periods is formed, the Bragg reflection band can be enlarged by about $\Delta\lambda \times n$ compared to the case in which the protrusion amount D is constant. As a result, wavelength dependency of Bragg reflection can be alleviated.

Figure 4:
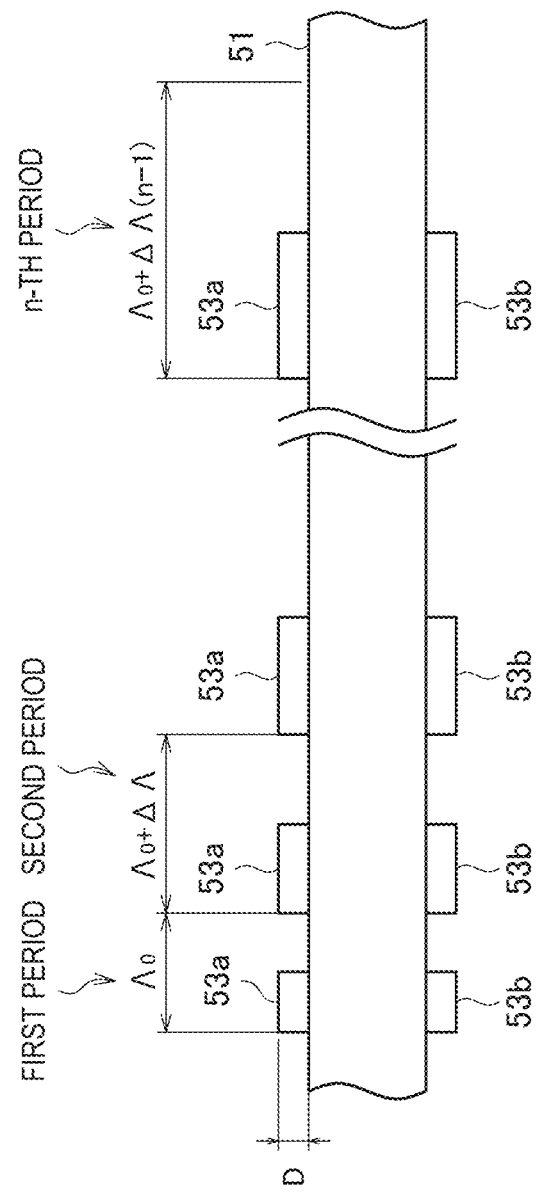
FIG. 4 is a schematic plan view illustrating a modified example of a grating.

As another modified example of enlarging the Bragg reflection band in the grating, a configuration in which the protrusion amount D of the protrusions 53a and 53b and the duty cycle are kept constant and the period $\Lambda_1$ changes for each period (that is, a separation distance between adjacent protrusions 53a and adjacent protrusions 53b in the light propagation direction changes in accordance with a constant amount of change in the light propagation direction) may be possible. This modified example is illustrated in FIG. 4. FIG. 4 is a schematic plan view illustrating the modified example of the grating. In FIG. 4, only the rib waveguide of the Bragg reflector is illustrated, and the support substrate, the cladding, and the slab waveguides are omitted.

In a configuration example illustrated in FIG. 4, the period $\Lambda_1$ increases by $\Delta\Lambda$ every period with a constant amount of change with respect to the period $\Lambda_1=\Lambda_0$ in the first period. Therefore, in an n-th period, the period $\Lambda_1$ is $\Lambda_0+\Delta\Lambda(n-1)$.

As the period $\Lambda_1$ changes, the Bragg wavelength $\lambda$ that satisfies Equation (1) above changes, and the equivalent refractive index changes accordingly. Therefore, the Bragg reflection band in the grating can also be expanded by changing the period $\Lambda_1$. The shift amount $\Delta\lambda$ of the Bragg wavelength for each period can be approximated by the following Equation (3) using the amount of change $\Delta\Lambda$ of the period $\Lambda_1$.

$$\Delta\lambda \approx \frac{(N_0+N_1)\Delta\Lambda}{1-\frac{\partial(N_0+N_1)}{\partial\lambda}(\Lambda_0+\Delta\Lambda)} \quad (3)$$

By adjusting $\Delta\Lambda$ and setting $\Delta\lambda$ such that Bragg wavelengths of the periods overlap, the Bragg reflection band can be expanded. Like the case in which the protrusion amount D is changed, for example, in the case in which a grating of n periods is formed, the Bragg reflection band can be enlarged by about $\Delta\lambda \times n$ compared to the case in which the period $\Lambda_1$ is constant. As a result, wavelength dependency of Bragg reflection can be alleviated.

The slab waveguides 38a and 38b have a thickness smaller than that of the rib waveguide 37 and are integrally formed with the rib waveguide 37 on both side surfaces of the rib waveguide 37, respectively, in the light propagation direction.

By including the rib waveguide 37 and the slab waveguides 38a and 38b, the electric field distribution of light propagating through the Bragg reflector 34 becomes eccentric in the thickness direction and becomes asymmetric vertically. By satisfying Equation (1) above in the Bragg reflector 34, the grating can convert a polarization of input light and reflect the light. This principle will be described with reference to FIGS. 5 and 6.

Figure 5:
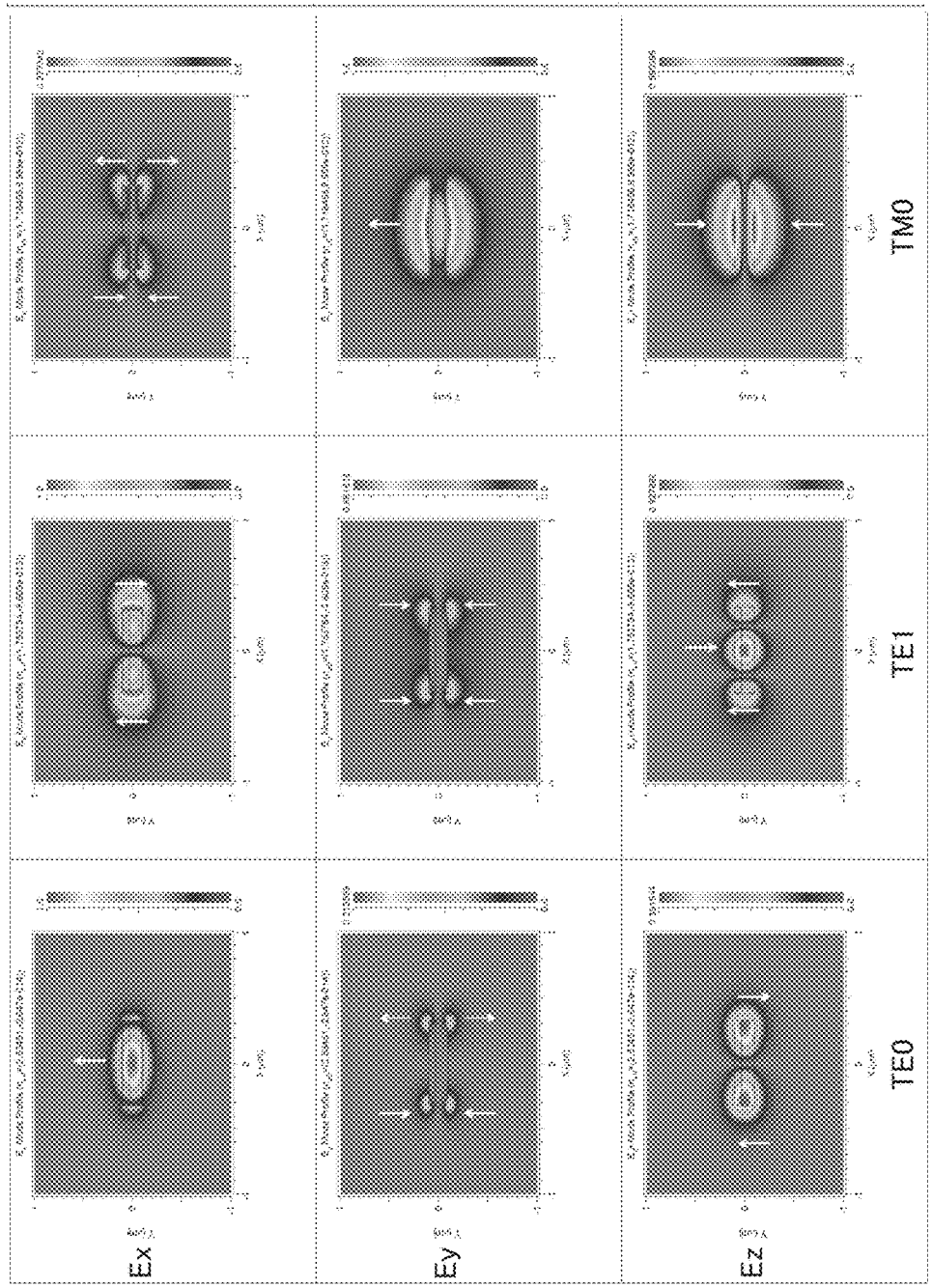
FIG. 5 is a diagram illustrating an electric field distribution of a TE polarized wave or a TM polarized wave propagating through an optical waveguide whose width is constant in a thickness direction.
Figure 6:
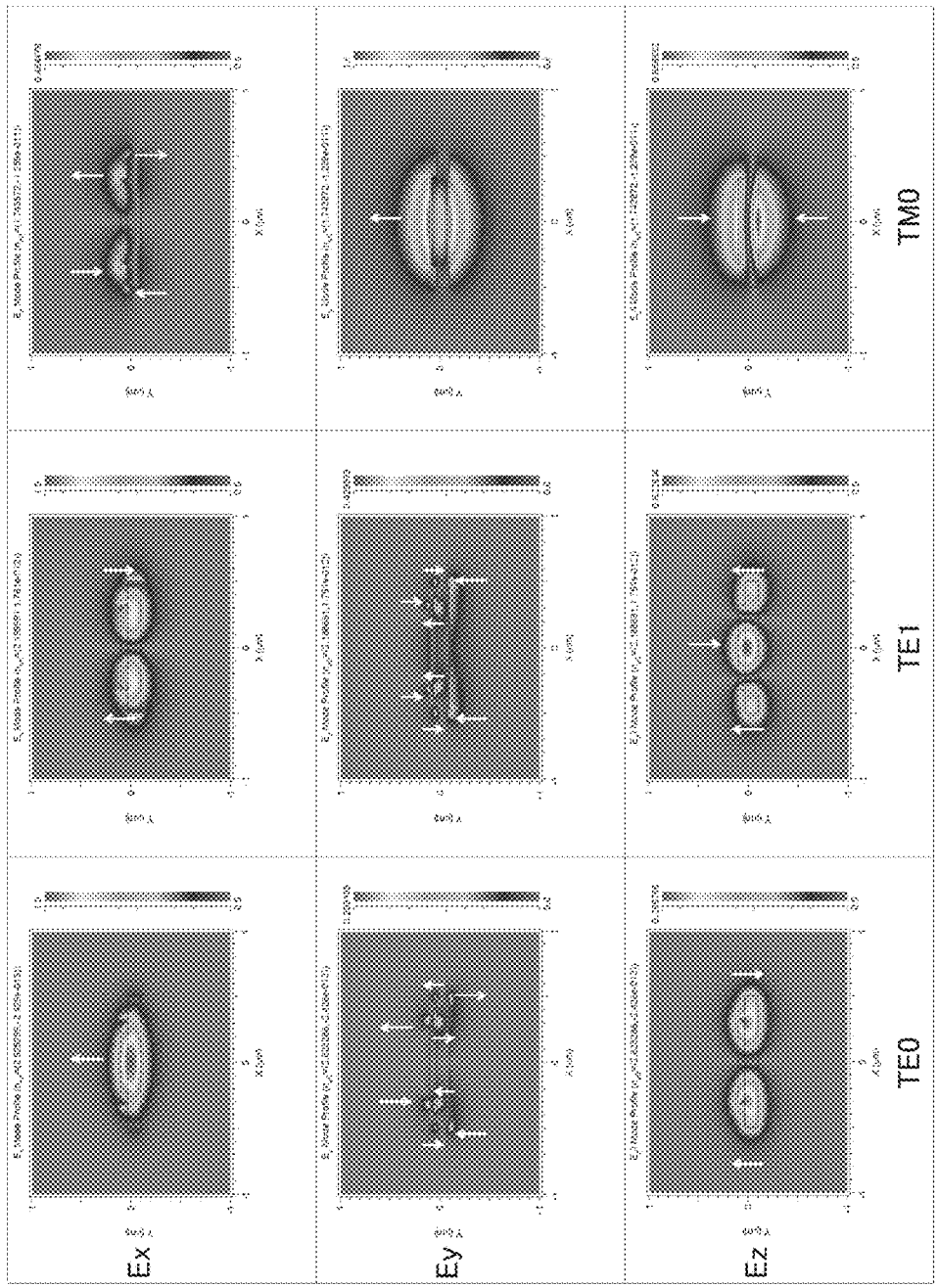
FIG. 6 is a diagram illustrating an electric field distribution of a TE polarized wave or a TM polarized wave propagating through the Bragg reflector of the first optical waveguide element.

FIG. 5 is a diagram illustrating an electric field distribution of a TE polarized wave or a TM polarized wave propagating through an optical waveguide without the slab waveguides, that is, an optical waveguide whose width is constant in a thickness direction (hereinafter also referred to as a comparative waveguide) and is a diagram for comparison with the Bragg reflector 34. FIG. 6 is a diagram illustrating an electric field distribution of a TE polarized wave or a TM polarized wave propagating through the Bragg reflector 34. In FIGS. 5 and 6, with respect to a TE polarized wave of the fundamental mode (a column TE0 illustrated in FIGS. 5 and 6), a TE polarized wave of the first-order mode (a column TE1 illustrated in FIGS. 5 and 6), and a TM polarized wave of the fundamental mode (a column TM0 illustrated in FIGS. 5 and 6), an $E_x$ component in the width direction of the electric field distribution, an $E_y$ component in the thickness direction, and an $E_z$ component in the longitudinal direction are illustrated. The arrows in FIGS. 5 and 6 indicate positive and negative directions of peaks of electric field distributions. A peak taking a positive value is indicated by an upward arrow, and a peak taking a negative value is indicated by a downward arrow.

Because a TE polarized wave and a TM polarized wave are orthogonal to each other, to cause mode coupling between both polarized waves, it is necessary to consider an electric field distribution of a waveguide mode related to coupling. Here, a coupling coefficient $\kappa$ between two modes (a first mode and a second mode) is shown by Equation (4) below in which ($o$ is an angular frequency, $\varepsilon_0$ is a dielectric constant under a vacuum, $E_{1x}$ is an electric field distribution component in the width direction of the first mode, $E_{2x}$ is an electric field distribution component in the width direction of the second mode, $E_{1y}$ is an electric field distribution component in the thickness direction of the first mode, $E_{2y}$ is an electric field distribution component in the thickness direction of the second mode, $E_{1z}$ is an electric field distribution component in the longitudinal direction of the first mode, $E_{2z}$ is an electric field distribution component in the longitudinal direction of the second mode, and $\delta\varepsilon$ is a variation term of a dielectric constant from the base in the grating.

$$\kappa=(1/4)\omega_\varepsilon\omega\int(E_{1x}E_{2x}+E_{1y}E_{2y}+E_{1z}E_{2z})\delta\varepsilon \cdot dS \quad (4)$$

First, in the comparative waveguide according to FIG. 5, coupling between a TE polarized wave of the fundamental mode and a TM polarized wave of the fundamental mode or between a TE polarized wave of the first-order mode and a TM polarized wave of the fundamental mode is considered.

Focusing on the $E_z$ component, the $E_z$ component of the TE polarized wave of the fundamental mode is an antisymmetric distribution in the width direction and is a symmetric distribution in the thickness direction. In contrast, the $E_z$ component of the TM polarized wave of the fundamental mode is a symmetric distribution in the width direction and is an antisymmetric distribution in the thickness direction. Because of this, $E_{1z}E_{2z}$ in the mode overlap term ($E_{1x}E_{2x}+E_{1y}E_{2y}+E_{1z}E_{2z}$) of Equation (4) above are cancelled between the both modes and become 0. Similarly, between the TE polarized wave of the fundamental mode and the TM polarized wave of the fundamental mode, the $E_x$ component and the $E_y$ component are also functions of symmetric distribution×antisymmetric distribution, and the mode overlap terms becomes 0. Because of this, the coupling coefficient $\kappa$ between the TE polarized wave of the fundamental mode and the TM polarized wave of the fundamental mode is 0. Therefore, in the comparative waveguide, coupling between the TE polarized wave of the fundamental mode and the TM polarized wave of the fundamental mode is not achieved.

Like the case of the TE polarized wave of the fundamental mode and the TM polarized wave of the fundamental mode, in the TE polarized wave of the first-order mode and the TM polarized wave of the fundamental mode, the mode overlap term becomes 0, and the coupling coefficient $\kappa$ becomes 0. Therefore, in the comparative waveguide, coupling between the TE polarized wave of the first-order mode and the TM polarized wave of the fundamental mode is not achieved similarly.

Next, in the Bragg reflector 34 according to FIG. 6, coupling between the TE polarized wave of the first-order mode and the TM polarized wave of the fundamental mode is considered.

Focusing on the $E_z$ component, the $E_z$ component of the TE polarized wave of the first-order mode is a symmetric distribution in the width direction and is an asymmetric distribution in the thickness direction. The $E_z$ component of the TM polarized wave of the fundamental mode is a symmetric distribution in the width direction and is an asymmetric distribution in the thickness direction. Because of this, $E_{1z}E_{2z}$ in the mode overlap term of Equation (4) above are not cancelled between the both modes. Similarly, between the TE polarized wave of the first-order mode and the TM polarized wave of the fundamental mode, the $E_x$ component and the $E_y$ component are also not cancelled. Because of this, the coupling coefficient κ between the TE polarized wave of the first-order mode and the TM polarized wave of the fundamental mode is a significant numerical value other than 0. Therefore, in the Bragg reflector 34, coupling between the TE polarized wave of the first-order mode and the TM polarized wave of the fundamental mode is achieved.

In this way, in the Bragg reflector 34 including the rib waveguide 37 and the slab waveguides 38a and 38b, the TM polarized wave of the fundamental mode can be converted into the TE polarized wave of the first-order mode through the grating. Here, in coupling between an even-number-order mode (including the fundamental mode) and an odd-number-order mode, the mode overlap term of Equation (4) above does not become 0. Therefore, in the grating of the Bragg reflector 34, mode conversion and polarization conversion can be performed between an even-number-order mode (including the fundamental mode) and an odd-number-order mode, and it is not limited to the conversion between the TM polarized wave of the fundamental mode and the TE polarized wave of the first-order mode.

Figure 7:
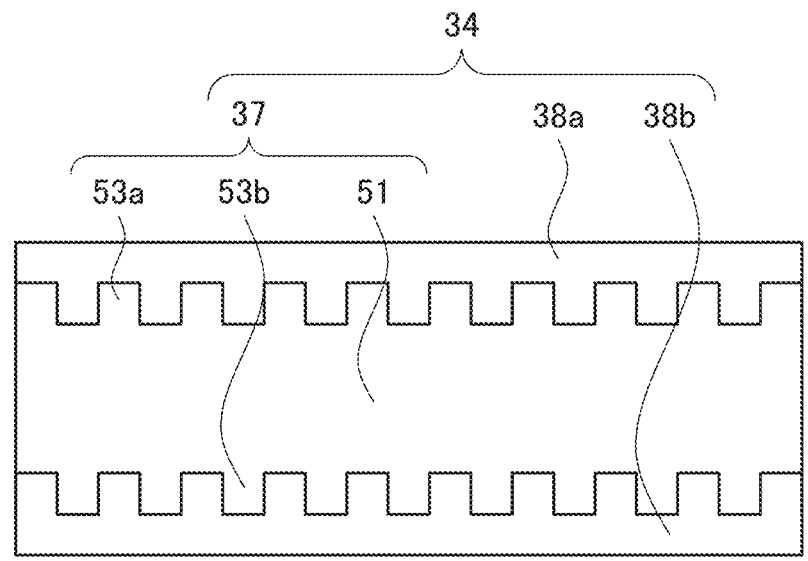
FIG. 7 is a schematic plan view illustrating a modified example of the grating.

As in the comparative waveguide, coupling between the TE polarized wave of the fundamental mode and the TM polarized wave of the fundamental mode is not achieved also in the Bragg reflector 34 because the mode overlap term of Equation (4) above becomes 0. However, in the Bragg reflector 34, the TE polarized wave of the fundamental mode and the TM polarized wave of the fundamental mode can be coupled by changing the design of the grating. A modified example of the grating in a case in which mode conversion and polarization conversion are performed between the TE polarized wave of the fundamental mode and the TM polarized wave of the fundamental mode will be described with reference to FIG. 7. FIG. 7 is a schematic plan view illustrating the modified example of the grating. In FIG. 7, only the Bragg reflector is illustrated, and the support substrate and the cladding are omitted.

In a configuration example illustrated in FIG. 7, in a case in which mode conversion and polarization conversion are performed, the protrusions 53a formed at one side surface of the base 51 and the protrusions 53b formed at the other side surface are arranged to be shifted by a half period (that is, Λ/2). In this case, the electric field distribution of light propagating through the Bragg reflector 34 is eccentric in the width direction. As a result, because the mode overlap term of Equation (4) above does not become 0, mode conversion and polarization conversion are possible between the TE polarized wave of the fundamental mode and the TM polarized wave of the fundamental mode. Here, in the grating illustrated in FIG. 7, in coupling between an even-number-order mode and an even-number-order mode or between an odd-number-order mode and an odd-number-order mode, the mode overlap term of Equation (4) above does not become 0. Therefore, in the grating illustrated in FIG. 7, mode conversion and polarization conversion can be performed between an even-number-order mode and an even-number-order mode and between an odd-number-order mode and an odd-number-order mode, and it is not limited to between the TE polarized wave of the fundamental mode and the TM polarized wave of the fundamental mode.

Therefore, any of the configuration according to FIGS. 2A and 2B and the configuration according to FIG. 7 may be selected as the design of the grating according to a mode order to be converted through the Bragg reflector 34. Here, because the Bragg reflector 34 converts the TM polarized wave of the fundamental mode into the TE polarized wave of the first-order mode, the grating is formed with the configuration according to FIGS. 2A and 2B.

The second connecting portion 35 connects the Bragg reflector 34 and the second port portion 36. The width of the second connecting portion 35 is set to continuously change from a width of the rib waveguide 37 at the other end 34b of the Bragg reflector 34 to a width of the second port portion 36 in the light propagation direction. Reflection of light propagating between the Bragg reflector 34 and the second port portion 36 can be alleviated by providing the second connecting portion 35.

The second port portion 36 is formed with a thickness and a width that satisfies a single mode condition for at least the TE polarized wave. Therefore, the second port portion 36 propagates the TE polarized wave of the fundamental mode.

The second coupling portion 41 is spaced apart from and arranged in parallel to the first coupling portion 32 of the first optical waveguide core 30. The geometrical design of the second coupling portion 41 will be described below.

The third port portion 42 is formed with a thickness and a width that satisfies a single mode condition for at least the TE polarized wave. Therefore, the third port portion 42 propagates the TE polarized wave of the fundamental mode.

In the first optical waveguide element 100, the coupling region 60 in which the first coupling portion 32 of the first optical waveguide core 30 and the second coupling portion 41 of the second optical waveguide core 40 are spaced apart from each other and arranged in parallel to each other is set. The coupling region 60 will be described with reference to FIGS. 8 and 9.

Figure 8:
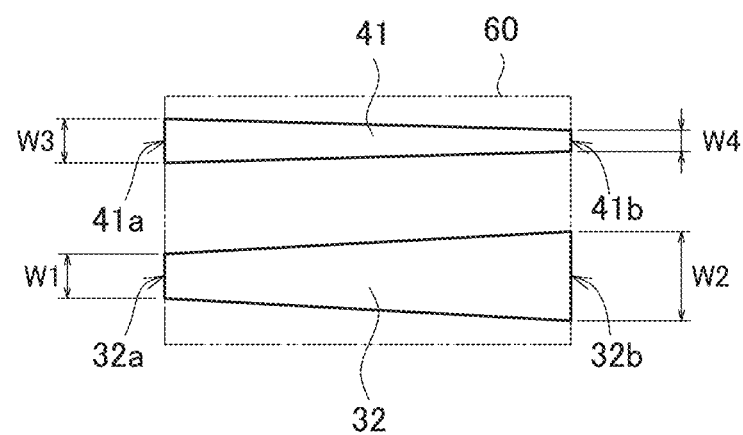
FIG. 8 is a schematic plan view illustrating a coupling region.

FIG. 8 is a schematic plan view illustrating the coupling region. In FIG. 8, the support substrate and the cladding are omitted.

Figure 9:
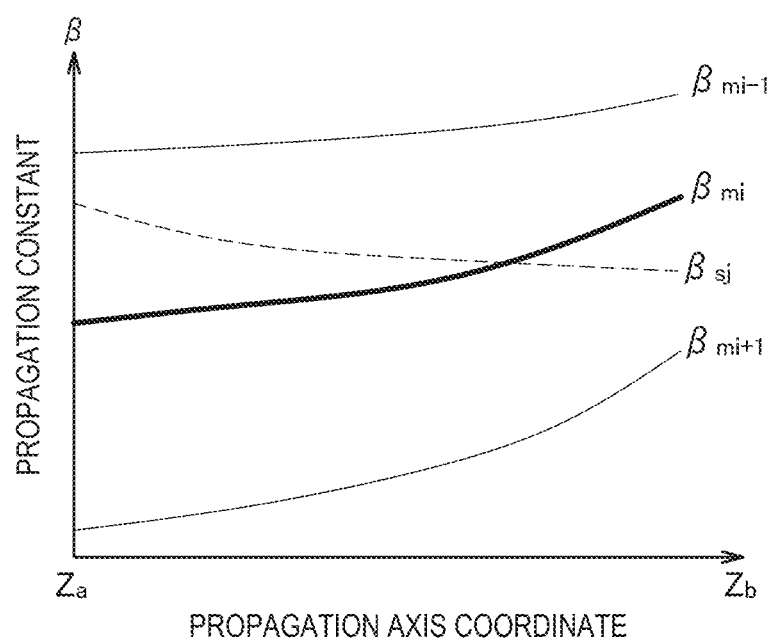
FIG. 9 is a diagram illustrating a relationship between a propagation constant of light propagating through a first coupling portion, a propagation constant of light propagating through a second coupling portion, and propagation axis coordinates.

FIG. 9 is a diagram illustrating a relationship between a propagation constant of light propagating through the first coupling portion 32, a propagation constant of light propagating through the second coupling portion 41, and propagation axis coordinates (coordinates in the longitudinal direction of the coupling region 60). In FIG. 9, the vertical axis represents the propagation constant and the horizontal axis represents the propagation axis coordinates in arbitrary units. Here, one end of the coupling region 60 at the one end 32a of the first coupling portion 32 and the one end 41a of the second coupling portion 41 is set as a propagation axis coordinate $Z_a$. The other end of the coupling region 60 at the other end 32b of the first coupling portion 32 and the other end 41b of the second coupling portion 41 is set as a propagation axis coordinate $Z_b$. In FIG. 9, a curve $\beta_{mi+1}$ indicates a propagation constant of light of an i+1$^{th}$-order mode (i is an integer equal to or larger than 1) propagating through the first coupling portion 32. A curve $\beta_{mi}$ indicates a propagation constant of light of an i$^{th}$-order mode propagating through the first coupling portion 32. A curve $3_{mi-1}$ indicates a propagation constant of light of an i−1$^{th}$-order mode propagating through the first coupling portion 32. A curve $\beta_{sj}$ indicates a propagation constant of light of a j$^{th}$-order mode (j is an integer equal to or larger than 0) propagating through the second coupling portion 41.

In the coupling region 60, the first coupling portion 32 has a tapered shape whose width continuously changes (enlarges) from the one end 32a to the other end 32b. In the coupling region 60, the second coupling portion 41 has a tapered shape whose width continuously changes (decreases) from the one end 41a to the other end 41b. Then, in the coupling region 60, the one end 32a of the first coupling portion 32 and the one end 41a of the second coupling portion 41 coincide with each other with regard to their surface positions, and the other end 32b of the first coupling portion 32 and the other end 41b of the second coupling portion 41 coincide with each other with regard to their surface positions.

As illustrated in FIG. 9, by designing a width W1 of the one end 32a and a width W2 of the other end 32b of the first coupling portion 32 and a width W3 of the one end 41a and a width W4 of the other end 41b of the second coupling portion 41 such that $\beta_{mi} < \beta_{sj} < \beta_{mi-1}$ is satisfied at the coordinate $Z_a$ and $\beta_{mi+1} < \beta_{sj} < \beta_{mi}$ is satisfied at the coordinate $Z_b$, the other polarized wave of the $i^{th}$-order mode propagating through the first coupling portion 32 and the other polarized wave of the $j^{th}$-order mode propagating through the second coupling portion 41 are coupled.

Here, the TE polarized wave of the first-order mode propagating through the first coupling portion 32 from the other end 32b to the one end 32a and the TE polarized wave of the fundamental mode propagating through the second coupling portion 41 from the other end 41b to the one end 41a are coupled. Therefore, the width W1 of the one end 32a of the first coupling portion 32 is set corresponding to the propagation constant that propagates the TE polarized wave of the fundamental mode and the TM polarized wave of the fundamental mode and does not propagate the TE polarized wave of the first-order mode or higher. The width W2 of the other end 32b of the first coupling portion 32 is set corresponding to the propagation constant that propagates the TE polarized wave of the fundamental mode, TE polarized wave of the first-order mode, and the TM polarized wave of the fundamental mode. The width W3 of the one end 41a and the width W4 of the other end 41b of the second coupling portion 41 are respectively set corresponding to the propagation constant that propagates the TE polarized wave of the fundamental mode and the propagation constant that does not propagate the TE polarized wave of the first-order mode or higher.

By designing the width W1 of the one end 32a and the width W2 of the other end 32b of the first coupling portion 32 and the width W3 of the one end 41a and the width W4 of the other end 41b of the second coupling portion 41 in such a way, a point at which the propagation constant of the TE polarized wave of the first-order mode of the first coupling portion 32 and the propagation constant of the TE polarized wave of the fundamental mode of the second coupling portion 41 coincide with each other is present in the coupling region 60. As a result, the TE polarized wave of the first-order mode propagating through the first coupling portion 32 and the TE polarized wave of the fundamental mode propagating through the second coupling portion 41 can be coupled.

In the first optical waveguide element 100 described above, an input TM polarized wave can be converted into a TE polarized wave and reflected, and an input TE polarized wave can be transmitted through the grating of the Bragg reflector 34. Therefore, both the light output from the second port portion 36 and the light output from the third port portion 42 can be aligned to the TE polarized wave. Therefore, the first optical waveguide element 100 can be used instead of the conventional polarization separating element and polarization rotating element.

The Bragg reflector 34 substantially having a polarization separating function and a polarization rotating function does not include a directional coupler and does not have to form two optical waveguide cores having different refractive indexes. Therefore, the first optical waveguide element 100 is less susceptible to manufacturing error and can be easily manufactured by simply performing an optical waveguide core forming process one time.

The configuration in which the grating of the Bragg reflector 34 converts the TM polarized wave of the fundamental mode into the TE polarized wave of the first-order mode and reflects the converted polarized wave on the basis of Bragg reflection has been described. However, the configuration of the first optical waveguide element 100 is not limited thereto.

By designing such that Equation (5) below is satisfied, a grating that converts a TE polarized wave of a $k^{th}$-order mode (k is an integer equal to or larger than 0) of an input wavelength $\lambda_1$ into a TM polarized wave of an $h^{th}$-order mode (h is an integer equal to or larger than 0), reflects the converted polarized wave on the basis of Bragg reflection, and transmits an input TM polarized wave can be formed. Note that, $N_{TEk}$ indicates an equivalent refractive index of the $k^{th}$-order mode of the TE polarized wave, and $N_{TMh}$ indicates an equivalent refractive index of the $h^{th}$-order mode of the TM polarized wave.

$$(N_{TEk} + N_{TMh})\Lambda_1 = \lambda_1 \qquad (5)$$

Alternatively, by designing such that Equation (6) below is satisfied, a grating that converts a TM polarized wave of a $k^{th}$-order of an input wavelength $\lambda_1$ into a TE polarized wave of an $h^{th}$-order mode, reflects the converted polarized wave on the basis of Bragg reflection, and transmits an input TE polarized wave can be formed. Note that, $N_{TMk}$ indicates an equivalent refractive index of the $k^{th}$-order mode of the TM polarized wave, and $N_{TEh}$ indicates an equivalent refractive index of the $h^{th}$-order mode of the TE polarized wave.

$$(N_{TMk} + N_{TEh})\Lambda_1 = \lambda_1 \qquad (6)$$

The coupling region 60 is not limited to the configuration of coupling the TE polarized wave of the fundamental mode and the TE polarized wave of the first-order mode. By appropriately setting the width W1 of the one end 32a and the width W2 of the other end 32b of the first coupling portion 32 and the width W3 of the one end 41a and the width W4 of the other end 41b of the second coupling portion 41, any one polarized wave of the $h^{th}$-order mode propagating through the first coupling portion 32 and any one polarized wave of an $m^{th}$-order mode (m is an integer equal to or larger than 0) propagating through the second coupling portion 41 can be coupled.

(Characteristics Evaluation)

The inventors conducted a simulation to evaluate characteristics of the first optical waveguide element 100 using finite differential time domain (FDTD).

In this simulation, the intensity of output light from the second port portion 36 and the third port portion 42 in a case in which a TE polarized wave of the fundamental mode is input from the first port portion 31 and the intensity of output light from the second port portion 36 and the third port portion 42 in a case in which a TM polarized wave of the fundamental mode is input from the first port portion 31 were analyzed.

In this simulation, the first optical waveguide element 100 was designed as follows. That is, the thickness of the first optical waveguide core 30 and the second optical waveguide core 40 was set to be 0.2 μm as a whole. In the Bragg reflector 34, the thickness of the rib waveguide 37 was set as 0.2 μm, and the thickness of the slab waveguides 38a and 38b was set as 0.13 μm. In addition, the width of the slab waveguides 38a and 38b (a dimension from an outer surface of the slab waveguide 38a to an outer surface of the slab waveguide 38b) was set as 1 μm.

With respect to the grating of the Bragg reflector 34, the Bragg wavelength $\lambda_1$ was set as 1.55 μm, and the grating of the Bragg reflector 34 was designed to convert the TM polarized wave of the fundamental mode into the TE polarized wave of the first-order mode and reflect the converted polarized wave. Here, by employing the structure according to FIG. 4 in which the period $\Lambda_1$ changes, a grating with 400 periods was formed and the period $\Lambda_1$ was changed within the range of 0.394±0.012 μm. The width of the base 51 was set as 0.48 μm, and the protrusion amount D of the protrusions 53a and 53b was set as 0.17 μm.

The coupling region 60 was designed such that the TE polarized wave of the first-order mode propagating through the first coupling portion 32 is converted into the TE polarized wave of the fundamental mode and is transitioned to the second coupling portion 41. The width W1 of the one end 32a of the first coupling portion 32 was set as 0.46 μm, the width W2 of the other end 32b of the first coupling portion 32 was set as 0.58 μm, the width W3 of the one end 41a of the second coupling portion 41 was set as 0.3 μm, and the width W4 of the other end 41b of the second coupling portion 41 was set as 0.1 μm. In addition, a coupling length (length of the coupling region 60) was set as 80 μm.

Figure 10A:
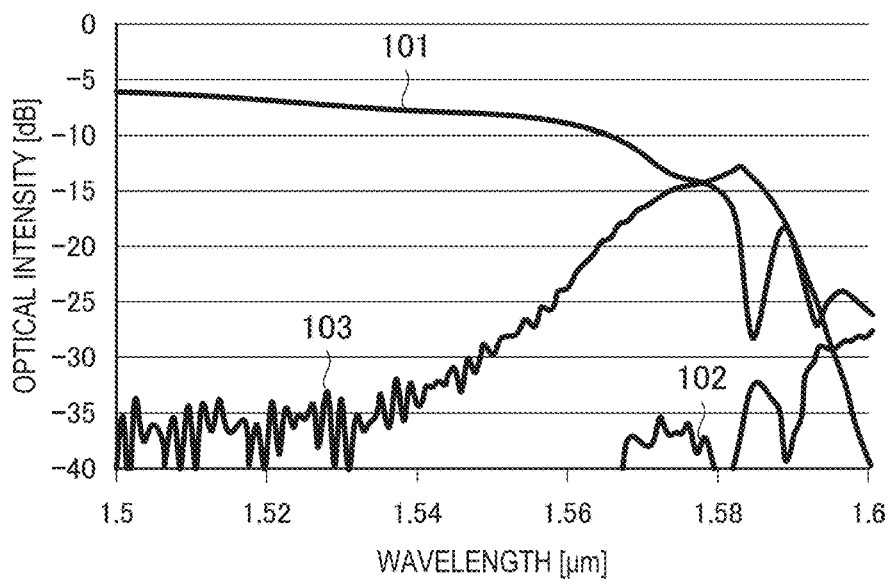
FIG. 10A is a diagram (Part 1) illustrating a result of a simulation of evaluating characteristics of a first optical waveguide element.
Figure 10B:
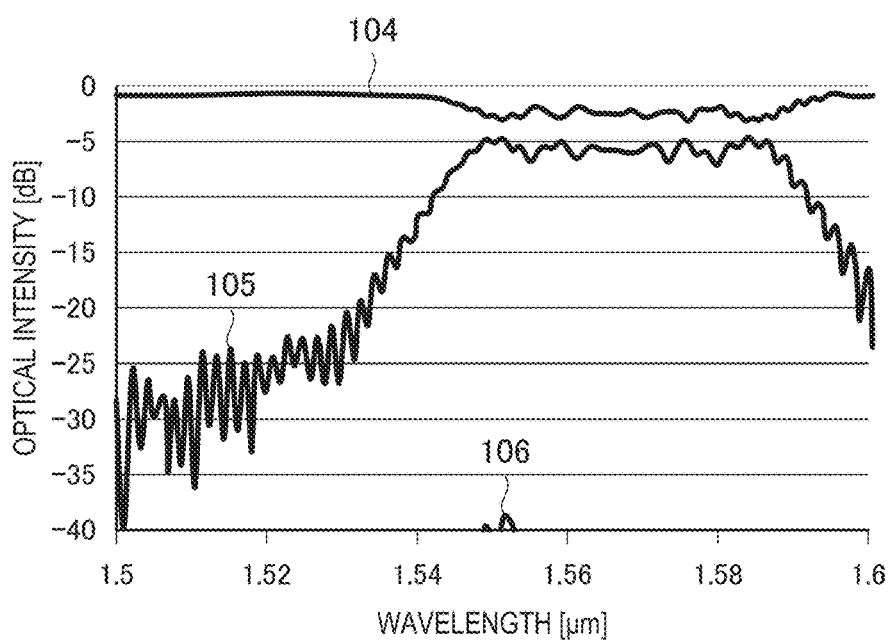
FIG. 10B is a diagram (Part 2) illustrating a result of a simulation for evaluating characteristics of the first optical waveguide element.

The results are shown in FIGS. 10A and 10B. FIG. 10A is a diagram illustrating the intensity of output light from the second port portion 36 and the third port portion 42 in the case in which the TE polarized wave of the fundamental mode is input from the first port portion 31. FIG. 10B is a diagram illustrating the intensity of output light from the second port portion 36 and the third port portion 42 in the case in which the TM polarized wave of the fundamental mode is input from the first port portion 31. In FIGS. 10A and 10B, the vertical axis represents the intensity of output light in dB scale, and the horizontal axis represents the wavelength in μm units. In FIG. 10A, a curve 101 represents the intensity of the TE polarized wave of the fundamental mode output from the second port portion 36, a curve 102 represents the intensity of the TE polarized wave of the fundamental mode output from the third port portion 42, and a curve 103 represents the intensity of the TM polarized wave of the fundamental mode output from the third port portion 42. Although the intensity of the TM polarized wave of the fundamental mode output from the second port portion 36 in the case in which the TE polarized wave of the fundamental mode is input from the first port portion 31 was also analyzed, because the intensity was −40 dB or lower, the result was not shown in FIG. 10A. In FIG. 10B, a curve 104 represents the intensity of the TM polarized wave of the fundamental mode output from the second port portion 36, a curve 105 represents the intensity of the TE polarized wave of the fundamental mode output from the third port portion 42, and a curve 106 represents the intensity of the TM polarized wave of the fundamental mode output from the third port portion 42.

As illustrated in FIG. 10A, in the case in which the TE polarized wave of the fundamental mode is input from the first port portion 31, the TE polarized wave of the fundamental mode is output from the second port portion 36 (the curve 101), and output of the TE polarized wave and the TM polarized wave from the third port portion 42 is suppressed (the curves 102 and 103). On the other hand, slight loss occurs in the TE polarized wave of the fundamental mode output from the second port portion 36. This is believed to be due to the fact that, in the grating of the Bragg reflector 34, the TE polarized wave of the fundamental mode is coupled to a radiation mode other than a guided wave, and a transmission component decreases. To solve this, for example, providing a polarization separating element at a front stage of the first optical waveguide element 100 and inputting only the polarized wave (here, the TM polarized wave) that is to be subjected to mode conversion and polarization conversion in the Bragg reflector 34 into the first optical waveguide element 100 may be considered. Details of the configuration (a second optical waveguide element) in which the polarization separating element is provided at the front stage of the first optical waveguide element 100 will be described below.

As illustrated in FIG. 10B, in the case in which the TM polarized wave of the fundamental mode is input from the first port portion 31, the TE polarized wave of the fundamental mode is mainly output from the third port portion 42 (the curve 105), and a TM polarized wave component is suppressed to about −40 dB or smaller (the curve 106). Therefore, the polarization separating function and the polarization rotating function in the first optical waveguide element 100 were confirmed. On the other hand, slight loss occurs in the TE polarized wave of the fundamental mode output from the third port portion 42. Also, the TM polarized wave of the fundamental mode is output from the second port portion 36 (the curve 104). These are believed to be due to the fact that, because the length of the grating of the Bragg reflector 34 was insufficient due to a limitation of FDTD calculation memory, sufficient reflection intensity was not obtained in the Bragg reflector 34. Therefore, it is considered that the above-described result may be solved by designing the length of the grating of the Bragg reflector 34 longer (for example, about 800 μm).

(Second Optical Waveguide Element)

Figure 11:
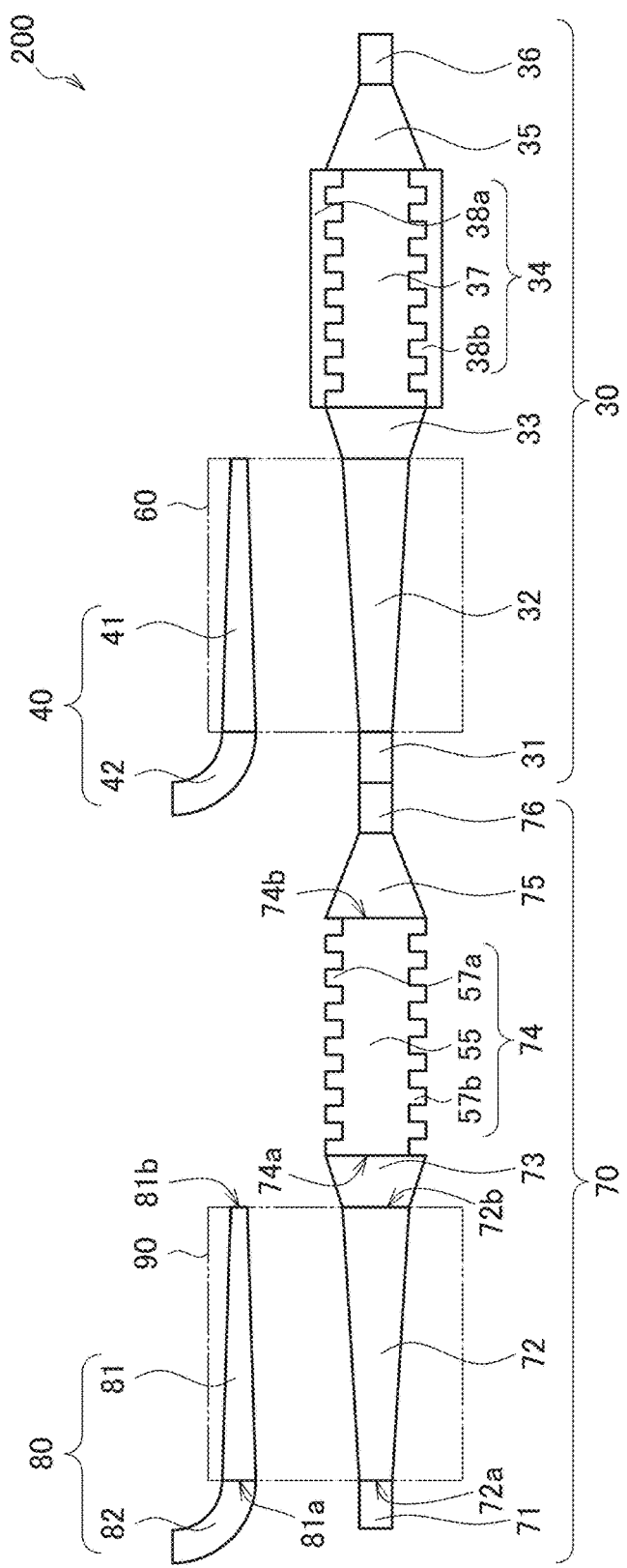
FIG. 11 is a schematic plan view illustrating a second optical waveguide element according to an embodiment of the present invention.

An optical waveguide element (hereinafter also referred to as a second optical waveguide element) according to a second embodiment of the invention will be described with reference to FIG. 11. FIG. 11 is a schematic plan view illustrating the second optical waveguide element. In FIG. 11, the support substrate and the cladding are omitted. Also, because the second optical waveguide element includes the above-described first optical waveguide element 100 (refer to FIGS. 1A and 1B), the same structural elements as those of the first optical waveguide element will be denoted by the same reference numerals, and descriptions thereof will be omitted. Here, the Bragg reflector included in the first optical waveguide element is also referred to as a first Bragg reflector, and the coupling region included in the first optical waveguide element is also referred to as a first coupling region.

In addition to the first optical waveguide element 100 described above, a second optical waveguide element 200 has a third optical waveguide core 70 and a fourth optical waveguide core 80 as polarization separating elements. The third optical waveguide core 70 and the fourth optical waveguide core 80 are formed on the support substrate 10 (refer to FIG. 1B) common to the first optical waveguide core 30 and the second optical waveguide core 40 by being included in the common cladding 20 (refer to FIG. 1B).

The third optical waveguide core 70 has a fourth port portion 71, a third coupling portion 72, a third connecting portion 73, a second Bragg reflector 74, a fourth connecting portion 75, and a fifth port portion 76 which are connected in series. The fourth optical waveguide core 80 has a fourth coupling portion 81 and a sixth port portion 82 which are connected in series. Further, a second coupling region 90 in which the third coupling portion 72 and the fourth coupling portion 81 are spaced apart from each other and arranged in parallel to each other is set.

The side of the second Bragg reflector 74 opposite to the side connected to the third coupling portion 72 and the side of the first coupling portion 32 opposite to the side connected to the first Bragg reflector 34 are connected via the fourth connecting portion 75, the fifth port portion 76, and the first port portion 31.

The second optical waveguide element 200 is used, for example, as an element for outputting an input optical signal in alignment with one of a transverse electric (TE) polarized wave and a transverse magnetic (TM) polarized wave. Here, as an example, a configuration example in which an optical signal of a fundamental mode including a TE polarized wave and a TM polarized wave is input from the fourth port portion 71, the TE polarized wave of the fundamental mode is not subjected to polarization conversion and is output from the sixth port portion 82, and the TM polarized wave of the fundamental mode is converted into the TE polarized wave of the fundamental mode and is output from the third port portion 42 will be described.

In this example, the optical signal including the TE polarized wave or the TM polarized wave of the fundamental mode is input to the fourth port portion 71 of the fourth optical waveguide core 70 and is sent to the second Bragg reflector 74 via the third coupling portion 72 and the third connecting portion 73. In a grating formed in the second Bragg reflector 74, the TE polarized wave of the fundamental mode included in the optical signal is converted into the TE polarized wave of the first-order mode, is Bragg reflected, and is sent again to the third coupling portion 72 via the third connecting portion 73. The TM polarized wave of the fundamental mode that is included in the optical signal and sent from the third connecting portion 73 is not subjected to mode conversion and polarization conversion and is sent to the fifth port portion 76 via the second Bragg reflector 74. The TE polarized wave of the first-order mode reflected by the grating of the second Bragg reflector 74 and propagating through the third coupling portion 72 is converted into the TE polarized wave of the fundamental mode in the second coupling region 90 and sent to the fourth coupling portion 81 of the fourth optical waveguide core 80. The TE polarized wave of the fundamental mode sent to the fourth coupling portion 81 is output from the sixth port portion 82.

The TM polarized wave of the fundamental mode sent to the fifth port portion 76 is input to the first port portion 31 connected to the fifth port portion 76. The TM polarized wave of the fundamental mode input from the first port portion 31 is sent to the first Bragg reflector 34 via the first coupling portion 32 and the first connecting portion 33. In the grating formed in the first Bragg reflector 34, the TM polarized wave of the fundamental mode is converted into the TE polarized wave of the first-order mode, is reflected on the basis of Bragg reflection, and is sent again to the first coupling portion 32 via the first connecting portion 33. The TE polarized wave of the first-order mode reflected by the grating of the first Bragg reflector 34 and propagating through the first coupling portion 32 is converted into the TE polarized wave of the fundamental mode in the first coupling region 60 and sent to the second coupling portion 41 of the second optical waveguide core 40. The TE polarized wave of the fundamental mode sent to the second coupling portion 41 is output from the third port portion 42.

The third optical waveguide core 70 is made of, for example, Si having a higher refractive index than the cladding. As a result, the third optical waveguide core 70 functions as a light transmission path, and light input to the third optical waveguide core 70 propagates in a propagation direction corresponding to a planar shape of the third optical waveguide core 70.

Like the third optical waveguide core 70, the fourth optical waveguide core 80 is made of, for example, Si having a higher refractive index than the cladding. As a result, the fourth optical waveguide core 80 functions as a light transmission path, and light input to the fourth optical waveguide core 80 propagates in a propagation direction corresponding to a planar shape of the fourth optical waveguide core 80.

To prevent propagating light from escaping to the support substrate, it is preferable that the third optical waveguide core 70 and the fourth optical waveguide core 80 be formed, for example, to be spaced at least 3 μm or more apart from the support substrate.

The fourth port portion 71 is formed with a thickness and a width to achieve a single mode condition for both the TE polarized wave and the TM polarized wave. Therefore, the fourth port portion 71 propagates the TE polarized wave and the TM polarized wave of the fundamental mode.

The third coupling portion 72 is connected to the fourth port portion 71 at one end 72a and is connected to the third connecting portion 73 at the other end 72b. The geometrical design of the third coupling portion 72 will be described below.

The third connecting portion 73 connects the third coupling portion 72 and the second Bragg reflector 74. The width of the third connecting portion 73 is set to continuously change from a width of the other end 72b of the third coupling portion 72 to a width of one end 74a of the second Bragg reflector 74 in a light propagation direction. Reflection of light propagating between the third coupling portion 72 and the second Bragg reflector 74 can be alleviated by providing the third connecting portion 73.

A grating is formed in the second Bragg reflector 74. The grating integrally includes a base 55 and protrusions 57a and 57b. The base 55 has a constant width and extends in the light propagation direction. Pluralities of protrusions 57a are periodically formed at one side surface of the base 55. Pluralities of protrusions 57b are formed on the other side surface of the base 55 at the same period as the protrusions 57a. The protrusions 57a and 57b are formed at positions shifted by a half period (that is, $\Lambda/2$) from each other.

In the grating according to the present embodiment, an input TE polarized wave of a predetermined wavelength is converted from the fundamental mode to the first-order mode, and reflected on the basis of Bragg reflection. Also, an input TM polarized wave of the fundamental mode is transmitted through the grating.

Conditions for a TE polarized wave having a wavelength $\lambda_2$ to be subjected to conversion from the fundamental mode to the first-order mode, and Bragg reflection are shown by Equation (7) below in which $N_{TE0}$ is an equivalent refractive index of the fundamental mode of the TE polarized wave, $N_{TE1}$ is an equivalent refractive index of the first-order mode of the TE polarized wave, and $\Lambda_2$ is a grating period (the period in which the protrusions 57a and 57b are formed).

$$(N_{TE0}+N_{TE1})\lambda_2=\lambda_2 \quad (7)$$

For the second Bragg reflector 74 as well, the modified example of the grating illustrated in FIGS. 3 and 4 can be applied to expand the Bragg reflection band.

The fourth connecting portion 75 connects the second Bragg reflector 74 and the fifth port portion 76. The width of the fourth connecting portion 75 is set to continuously change from a width of the other end 74b of the second Bragg reflector 74 to a width of the fifth port portion 76 in the light propagation direction. Reflection of light propagating between the second Bragg reflector 74 and the fifth port portion 76 can be alleviated by providing the fourth connecting portion 75.

The fifth port portion 76 is formed with a thickness and a width that satisfies a single mode condition for at least the TM polarized wave. Therefore, the fifth port portion 76 propagates the TM polarized wave of the fundamental mode. The end of the fifth port portion 76 opposite to the side connected to the fourth connecting portion 75 is connected to the end of the first port portion 31 of the first optical waveguide core 30 opposite to the side connected to the first coupling portion 32.

The fourth coupling portion 81 is spaced apart from and arranged in parallel to the third coupling portion 72 of the third optical waveguide core 70. The geometrical design of the fourth coupling portion 81 will be described below.

The sixth port portion 82 is formed with a thickness and a width that satisfies a single mode condition for at least the TE polarized wave. Therefore, the sixth port portion 82 propagates the TE polarized wave of the fundamental mode.

In the second optical waveguide element 200, the coupling region 90 in which the third coupling portion 72 of the third optical waveguide core 70 and the fourth coupling portion 81 of the fourth optical waveguide core 80 are spaced apart from each other and arranged in parallel to each other is set. The third coupling portion 72 and the fourth coupling portion 81 in the coupling region 90 may be designed in a similar way as the first coupling portion 32 and the second coupling portion 41 in the first coupling region 60 using the propagation constant relationships illustrated in FIG. 9.

In the second coupling region 90, the third coupling portion 72 has a tapered shape whose width continuously changes (enlarges) from the one end 72a to the other end 72b. In the second coupling region 90, the fourth coupling portion 81 has a tapered shape whose width continuously changes (decreases) from the one end 81a to the other end 81b. Then, in the second coupling region 90, the one end 72a of the third coupling portion 72 and the one end 81a of the fourth coupling portion 81 coincide with each other with regard to their surface positions, and the other end 72b of the third coupling portion 72 and the other end 81b of the fourth coupling portion 81 coincide with each other with regard to their surface positions.

Here, the TE polarized wave of the first-order mode propagating through the third coupling portion 72 from the other end 72b to the one end 72a and the TE polarized wave of the fundamental mode propagating through the fourth coupling portion 81 from the other end 82b to the one end 82a are coupled. Therefore, the width of the one end 72a of the third coupling portion 72 is set corresponding to the propagation constant that propagates the TE polarized wave of the fundamental mode and the TM polarized wave of the fundamental mode and does not propagate the TE polarized wave of the first-order mode or higher. The width of the other end 72b of the third coupling portion 72 is set corresponding to the propagation constant that propagates the TE polarized wave of the fundamental mode, TE polarized wave of the first-order mode, and the TM polarized wave of the fundamental mode. The width of the one end 81a and the width of the other end 81b of the fourth coupling portion 81 are respectively set corresponding to the propagation constant that propagates the TE polarized wave of the fundamental mode and the propagation constant that does not propagate the TE polarized wave of the first-order mode or higher.

By designing the width of the one end 72a and the width of the other end 72b of the third coupling portion 72 and the width of the one end 81a and the width of the other end 81b of the fourth coupling portion 81 in such a way, a point at which the propagation constant of the TE polarized wave of the first-order mode of the third coupling portion 72 and the propagation constant of the TE polarized wave of the fundamental mode of the fourth coupling portion 81 coincide with each other is present in the second coupling region 90. As a result, the TE polarized wave of the first-order mode propagating through the third coupling portion 72 and the TE polarized wave of the fundamental mode propagating through the fourth coupling portion 81 can be coupled.

In the second optical waveguide element 200 described above, by providing the third optical waveguide core 70 and the fourth optical waveguide core 80 as polarization separating elements, only the TE polarized wave that is not to be subjected to polarization conversion in the first Bragg reflector 34 of the first optical waveguide core 30 at the rear stage may be separated and output from the sixth port portion 82. In the second optical waveguide element 200, light input to the first port portion 31 of the first optical waveguide core 30 may be limited to the TM polarized wave that is to be subjected to polarization conversion in the first Bragg reflector 34. Therefore, because the TE polarized wave that is not to be subjected to polarization conversion is not input to the first Bragg reflector 34, decrease in the transmission component in the grating of the first Bragg reflector 34, which is described with reference to FIG. 10A, can be prevented.

Here, a configuration in which the grating of the second Bragg reflector 74 converts the TE polarized wave of the fundamental mode into the TE polarized wave of the first-order mode and reflects the converted polarized wave on the basis of Bragg reflection will be described. However, the second optical waveguide element 200 is not limited to this configuration. The design can be appropriately changed according to design of the first optical waveguide core 30 and the second optical waveguide core 40 at the rear stage.

By designing such that Equation (8) below is satisfied, a grating that converts a TE polarized wave of a $p^{th}$-order mode (p is an integer equal to or larger than 0) of an input wavelength $\lambda_2$ into a TE polarized wave of an $q^{th}$-order mode (q is an integer equal to or larger than 0 that is different from p), reflects the converted polarized wave on the basis of Bragg reflection, and transmits an input TM polarized wave can be formed. Note that, $N_{TEp}$ indicates an equivalent refractive index of the $p^{th}$-order mode of the TE polarized wave, and $N_{TMq}$ indicates an equivalent refractive index of the $q^{th}$-order mode of the TE polarized wave.

$$(N_{TEp}+N_{TEq})\Lambda_2=\lambda_2 \qquad (8)$$

Alternatively, by designing such that Equation (9) below is satisfied, a grating that converts a TM polarized wave of a $p^{th}$-order of an input wavelength $\lambda_2$ into a TM polarized wave of an $q^{th}$-order mode, reflects the converted polarized wave on the basis of Bragg reflection, and transmits an input TE polarized wave can be formed. Note that, $N_{TMp}$ indicates an equivalent refractive index of the $p^{th}$-order mode of the TM polarized wave, and $N_{TEq}$ indicates an equivalent refractive index of the $q^{th}$-order mode of the TE polarized wave.

$$(N_{TMp}+N_{TMq})\Lambda_2=\lambda_2 \qquad (9)$$

The second coupling region 90 is not limited to the configuration of coupling the TE polarized wave of the fundamental mode and the TE polarized wave of the first-order mode. By appropriately setting the width of the one end 72a and the width of the other end 72b of the third coupling portion 72 and the width of the one end 81a and the width of the other end 81b of the fourth coupling portion 81, any one polarized wave of the $q^{th}$-order mode propagating through the third coupling portion 72 and any one polarized wave of an $r^{th}$-order mode (r is an integer equal to or larger than 0) propagating through the fourth coupling portion 81 can be coupled.

(Characteristics Evaluation)

The inventors conducted a simulation to evaluate characteristics of the polarization separating elements (the third optical waveguide core 70 and the fourth optical waveguide core 80) of the second optical waveguide element 200 using FDTD.

In this simulation, the intensity of output light from the fifth port portion 76 and the sixth port portion 82 in a case in which a TE polarized wave of the fundamental mode and a TM polarized wave of the fundamental mode are input from the fourth port portion 71 were analyzed.

In addition, in this simulation, the third optical waveguide core 70 and the fourth optical waveguide core 80 were designed as follows. That is, the thickness of the third optical waveguide core 70 and the fourth optical waveguide core 80 was set as 0.2 µm as a whole.

With respect to the grating of the second Bragg reflector 74, the Bragg wavelength $\lambda_2$ was set as 1.55 µm, and the grating of the Bragg reflector 34 was designed to convert the TE polarized wave of the fundamental mode into the TE polarized wave of the first-order mode and reflect the converted polarized wave. Here, by employing the structure according to FIG. 4 in which the period $\Lambda_2$ changes, a grating with 400 periods was formed and the period $\Lambda_2$ was changed within the range of 0.371±0.012 µm. The width of the base 55 was set as 0.52 µm, and the protrusion amount D of the protrusions 57a and 57b was set as 0.1 µm.

The second coupling region 90 was designed such that the TE polarized wave of the first-order mode propagating through the third coupling portion 72 is converted into the TE polarized wave of the fundamental mode and is transitioned to the fourth coupling portion 81. The width of the one end 72a of the third coupling portion 72 was set as 0.46 µm, the width of the other end 72b of the third coupling portion 72 was set as 0.58 µm, the width of the one end 81a of the fourth coupling portion 81 was set as 0.3 µm, and the width of the other end 81b of the fourth coupling portion 81 was set as 0.1 µm. In addition, a coupling length (length of the second coupling region 90) was set as 80 µm.

Figure 12:
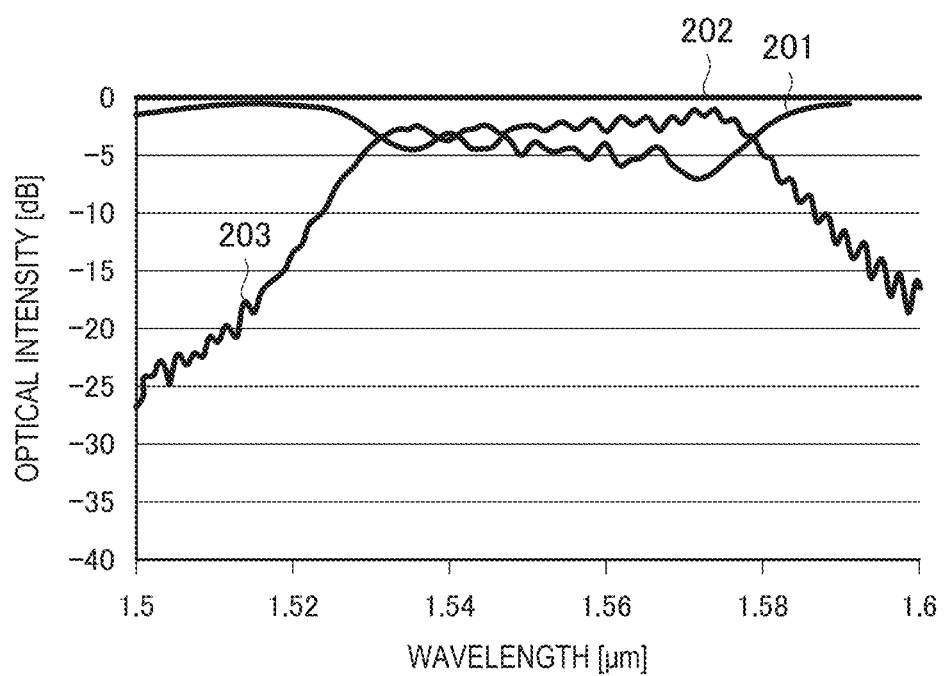
FIG. 12 is a diagram illustrating a result of a simulation for evaluating characteristics of the second optical waveguide element.

The results are shown in FIG. 12. In FIG. 12, the vertical axis represents the intensity of output light in dB scale, and the horizontal axis represents the wavelength in µm units. In FIG. 12, a curve 201 represents the intensity of the TE polarized wave of the fundamental mode output from the fifth port portion 76 in a case in which the TE polarized wave of the fundamental mode is input from the fourth port portion 71. A curve 202 represents the intensity of the TM polarized wave of the fundamental mode output from the fifth port portion 76 in a case in which the TM polarized wave of the fundamental mode is input from the fourth port portion 71. A curve 203 represents the intensity of the TE polarized wave of the fundamental mode output from the sixth port portion 82 in a case in which the TE polarized wave of the fundamental mode is input from the fourth port portion 71. Although the intensity of the TM polarized wave of the fundamental mode output from the sixth port portion 82 in the case in which the TM polarized wave of the fundamental mode is input from the fourth port portion 71 was also analyzed, because the intensity was −40 dB or lower, the result was not shown in FIG. 12.

The TE polarized wave of the fundamental mode illustrated as the curve 203 in FIG. 12 is output from the sixth port portion 82. As described above, in the TM polarized wave, the TM polarized wave component is suppressed to about −40 dB or smaller. The TM polarized wave of the fundamental mode illustrated as the curve 202 in FIG. 12 is output without loss from the fifth port portion 76. From this result, the polarization separating function in the polarization separating elements of the second optical waveguide element 200 was confirmed. On the other hand, slight loss occurs in the TE polarized wave of the fundamental mode output from the sixth port portion 82. Also, the TE polarized wave of the fundamental mode is output from the fifth port portion 76 (the curve 201). These are believed to be due to the fact that, because the length of the grating of the second Bragg reflector 74 was insufficient due to a limitation of FDTD calculation memory, sufficient reflection intensity was not obtained in the second Bragg reflector 74. Therefore, it is considered that the above-described result may be solved by designing the length of the grating of the second Bragg reflector 74 longer (for example, about 500 µm).

(First Receiving Circuit)

Figure 13:
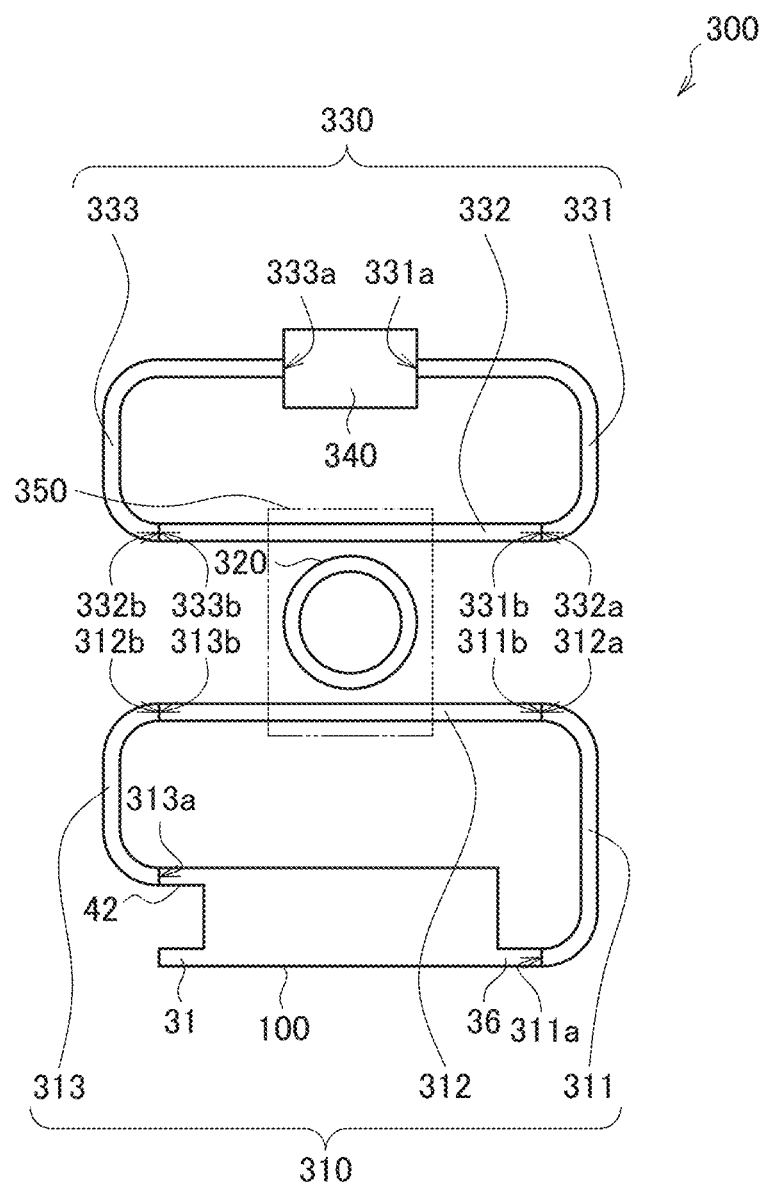
FIG. 13 is a schematic plan view illustrating a first receiving circuit according to an embodiment of the present invention.

A receiving circuit (hereinafter also referred to as a first receiving circuit) according to a third embodiment of the present invention will be described with reference to FIG. 13. FIG. 13 is a schematic plan view illustrating the first receiving circuit. In FIG. 13, the support substrate and the cladding are omitted. Also, because the first receiving circuit includes the above-described first optical waveguide element 100 (refer to FIGS. 1A and 1B), the first optical waveguide element 100 is illustrated in a simplified manner, and the common structural elements will be denoted by the same reference numerals, and description thereof will be omitted.

In addition to the above-described first optical waveguide element 100, a first receiving circuit 300 has a front-stage connection waveguide core 310, a ring waveguide core 320, a rear-stage connection waveguide core 330, and a light receiving element 340. The front-stage connection waveguide core 310, the ring waveguide core 320, the rear-stage connection waveguide core 330, and the light receiving element 340 are formed on the support substrate 10 (refer to FIG. 1B) common to the first optical waveguide core 30 and the second optical waveguide core 40 of the first optical waveguide element 100 by being included in the common cladding 20 (refer to FIG. 1B).

The front-stage connection waveguide core 310 has a first arm portion 311, a first linear portion 312, and a second arm portion 313 which are connected in series. The rear-stage connection waveguide core 330 has a third arm portion 331, a second linear portion 332, and a fourth arm portion 333 which are connected in series. In addition, a wavelength filter portion 350 is formed by the first linear portion 312, the ring waveguide core 320, and the second linear portion 332 that faces the first linear portion 312 with the ring waveguide core 320 interposed therebetween.

For example, the first receiving circuit 300 is used as a circuit that causes an input optical signal to be aligned to either a TE polarized wave or a TM polarized wave and received by the light receiving element 340. Here, as an example, a configuration example in which an optical signal of a fundamental mode including a TE polarized wave and a TM polarized wave is input from the first port portion 31, and in the first optical waveguide element 100, the TE polarized wave of the fundamental mode is not subjected to polarization conversion and is output from the second port portion 36, and the TM polarized wave of the fundamental mode is converted into the TE polarized wave of the fundamental mode and is output from the third port portion 42, and the TE polarized wave of the fundamental mode output from the second port portion 36 and the third port portion 42 is received by the light receiving element 340 will be described.

In this example, the optical signal including the TE polarized wave or the TM polarized wave of the fundamental mode is input to the first port portion 31 of the first optical waveguide element 100. Then, in the first optical waveguide element 100, the TE polarized wave of the fundamental mode included in the optical signal is not subjected to mode conversion and polarization conversion and is output from the second port portion 36. The TM polarized wave of the fundamental mode included in the optical signal is converted into the TE polarized wave of the fundamental mode and is output from the third port portion 42.

The TE polarized wave (hereinafter also referred to as a first TE polarized wave in this embodiment) of the fundamental mode output from the second port portion 36 is input to the first arm portion 311 of the front-stage connection waveguide core 310 and is sent to the first linear portion 312. Among the first TE polarized waves propagating through the first linear portion 312, the first TE polarized wave of a specific wavelength is sent to the second linear portion 332 of the rear-stage connection waveguide core 330 via the ring waveguide core 320 in the wavelength filter portion 350. The first TE polarized wave of the specific wavelength sent to the second linear portion 332 is received by the light receiving element 340 via the third arm portion 331.

On the other hand, the TE polarized wave (hereinafter also referred to as a second TE polarized wave in this embodiment) of the fundamental mode output from the third port portion 42 is input to the second arm portion 313 of the front-stage connection waveguide core 310 and is sent to the first linear portion 312. Among the second TE polarized waves propagating through the first linear portion 312, the second TE polarized wave of a specific wavelength is sent to the second linear portion 332 of the rear-stage connection waveguide core 330 via the ring waveguide core 320 in the wavelength filter portion 350. The second TE polarized wave of the specific wavelength sent to the second linear portion 332 is received by the light receiving element 340 via the fourth arm portion 333.

The front-stage connection waveguide core 310, the ring waveguide core 320, and the rear-stage connection waveguide core 330 are made of, for example, Si having a higher refractive index than the cladding. As a result, the front-stage connection waveguide core 310, the ring waveguide core 320, and the rear-stage connection waveguide core 330 function as light transmission paths, and input light propagates in a propagation direction corresponding to the planar shape.

To prevent propagating light from escaping to the support substrate, the front-stage connection waveguide core 310, the ring waveguide core 320, and the rear-stage connection waveguide core 330 are preferably formed, for example, to be spaced at least 3 µm or more apart from the support substrate 10.

For example, the first arm portion 311 may be configured by combining a curved waveguide and a linear waveguide. One end 311a of the first arm portion 311 is connected to the second port portion 36 of the first optical waveguide element 100. The other end 311b of the first arm portion 311 is connected to one end 312a of the first linear portion 312. The first arm portion 311 is formed with a thickness and a width that satisfies a single mode condition for at least the TE polarized wave. Therefore, the first arm portion 311 propagates the TE polarized wave of the fundamental mode.

The first linear portion 312 may be configured as a linear waveguide. The first linear portion 312 is formed with a thickness and a width that satisfies a single mode condition for at least the TE polarized wave. Therefore, the first linear portion 312 propagates the TE polarized wave of the fundamental mode.

For example, the second arm portion 313 may be configured by combining a curved waveguide and a linear waveguide. One end 313a of the second arm portion 313 is connected to the third port portion 42 of the first optical waveguide element 100. The other end 313b of the second arm portion 313 is connected to the other end 312b of the first linear portion 312. The second arm portion 313 is formed with a thickness and a width that satisfies a single mode condition for at least the TE polarized wave. Therefore, the second arm portion 313 propagates the TE polarized wave of the fundamental mode.

The ring waveguide core 320 may be formed by a ring-shaped waveguide. The ring waveguide core 320 is provided at a position between the first linear portion 312 and the second linear portion 332 to be separated from each of the first linear portion 312 and the second linear portion 332. A length of a circumference of the ring waveguide core 320 is designed corresponding to a wavelength extracted with respect to the TE polarized wave of the fundamental mode propagating through the first linear portion 312.

For example, the third arm portion 331 may be configured by combining a curved waveguide and a linear waveguide. One end 331a of the third arm portion 331 is connected to the light receiving element 340. The other end 331b of the third arm portion 331 is connected to one end 332a of the second linear portion 332. The third arm portion 331 is formed with a thickness and a width that satisfies a single mode condition for at least the TE polarized wave. Therefore, the third arm portion 331 propagates the TE polarized wave of the fundamental mode.

The second linear portion 332 may be configured as a linear waveguide. The second linear portion 332 is formed at a position facing the first linear portion 312 with the ring waveguide core 320 interposed therebetween. The second linear portion 332 is formed with a thickness and a width that satisfies a single mode condition for at least the TE polarized wave. Therefore, the second linear portion 332 propagates the TE polarized wave of the fundamental mode.

For example, the fourth arm portion 333 may be configured by combining a curved waveguide and a linear waveguide. One end 333a of the fourth arm portion 333 is connected to the light receiving element 340 at a side opposite to the third arm portion 331. The other end 333b of the fourth arm portion 333 is connected to the other end 332b of the second linear portion 332. The fourth arm portion 333 is formed with a thickness and a width that satisfies a single mode condition for at least the TE polarized wave. Therefore, the fourth arm portion 333 propagates the TE polarized wave of the fundamental mode.

For example, an optical waveguide type photodiode may be used for the light receiving element 340.

In the first receiving circuit 300, the wavelength filter portion 350 as a ring resonator is formed by the first linear portion 312, the ring waveguide core 320, and the second linear portion 332 opposite to the first linear portion 312 with the ring waveguide core 320 interposed therebetween.

In the wavelength filter portion 350, among the TE polarized waves of the fundamental mode propagating through the first linear portion 312, the TE polarized wave of the fundamental mode of a specific wavelength according to the length of the circumference of the ring waveguide core 320 is transitioned to the second linear portion 332 of the rear-stage connection waveguide core 330.

Since the first receiving circuit 300 described above has the first optical waveguide element 100 having the polarization separating function and the polarization rotating function, light may be aligned to either the TE polarized wave or the TM polarized wave and received by the light receiving element 340. By using the first optical waveguide element 100, the first receiving circuit 300 is less susceptible to manufacturing error and can be easily manufactured.

Here, the configuration in which the TE polarized wave of the fundamental mode is output from the second port portion 36 and the TE polarized wave of the fundamental mode is output from the third port portion 42 has been described. However, the first receiving circuit 300 is not limited to this configuration. According to design of the first optical waveguide element 100, a configuration in which a TE polarized wave of a $p^{th}$-order mode is output from the second port portion 36 and a TE polarized wave of an $m^{th}$-order mode is output from the third port portion 42 or a configuration in which a TM polarized wave of a $p^{th}$-order mode is output from the second port portion 36 and a TM polarized wave of an $m^{th}$-order mode is output from the third port portion 42 can be used. In this case, the front-stage connection waveguide core 310, the ring waveguide core 320, and the rear-stage connection waveguide core 330 may be designed in accordance with a polarized wave and mode order output from the second port portion 36 and the third port portion 42.

When the mode order is different between light output from the second port portion 36 and light output from the third port portion 42, two ring waveguide cores 320 designed according to respective order modes may be formed in parallel between the first linear portion 312 and the second linear portion 332, and a plurality of wavelength filter portions 350 may be configured.

Here, although the configuration example in which a ring resonator is used as the wavelength filter portion 350 has been described, the wavelength filter portion 350 is not limited to a ring resonator. For example, other wavelength filters such as a Mach-Zehnder interferometer may also be used as the wavelength filter portion 350.

Figure 14:
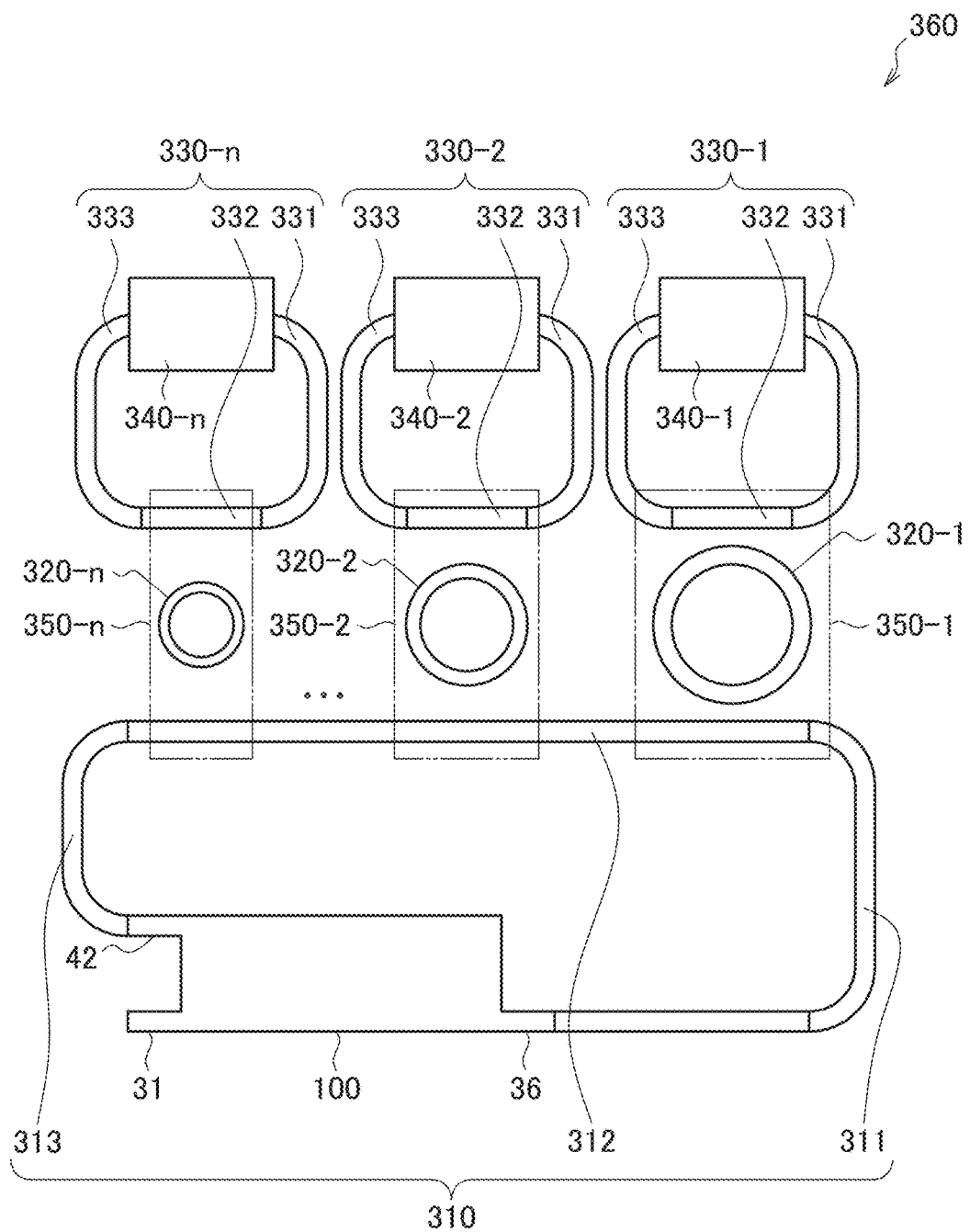
FIG. 14 is a schematic plan view illustrating a modified example of the first receiving circuit according to an embodiment of the present invention.

In addition, as a modified example, the first receiving circuit 300 may be configured to extract a plurality of different specific wavelengths from light output from the second port portion 36 and the third port portion 42. The configuration in such a case is illustrated in FIG. 14. FIG. 14 is a schematic plan view illustrating a modified example of the first receiving circuit. In FIG. 14, the support substrate and the cladding are omitted.

In a first receiving circuit 360 according to the modified example, a plurality of ring waveguide cores 320-1 to 320-$n$ having different circumferential lengths are formed in parallel. In the first receiving circuit 360 according to the modified example, a plurality of rear-stage connection waveguide cores 330-1 to 330-$n$ are formed in one-to-one correspondence with the ring waveguide cores 320-1 to 320-$n$, respectively. Therefore, in the first receiving circuit 360 according to the modified example, a plurality of wavelength filter portions 350-1 to 350-$n$ are provided. The wavelength filter portions 350-1 to 350-$n$ are connected to different light receiving elements 340-1 to 340-$n$ by the rear-stage connection waveguide cores 330-1 to 330-$n$.

Since the first receiving circuit 360 according to the modified example includes the plurality of ring waveguide cores 320-1 320-$n$ having different circumferential lengths, the plurality of rear-stage connection waveguide cores 330-1 to 330-$n$, and the plurality of light receiving elements 340-1 to 340-$n$ as described above, light of a specific wavelength according to the circumferential length of each of the ring waveguide cores 320-1 to 320-$n$ among light propagating through the first linear portion 312 is transitioned to the second linear portion 332 of the rear-stage connection waveguide cores 330-1 to 330-$n$ in each of the wavelength filter portions 350-1 to 350-$n$. Therefore, in the first receiving circuit 360 according to the modified example, light of a plurality of different specific wavelengths can be received by the different light receiving elements 340-1 to 340-$n$ for each wavelength.

(Second Receiving Circuit)

Figure 15:
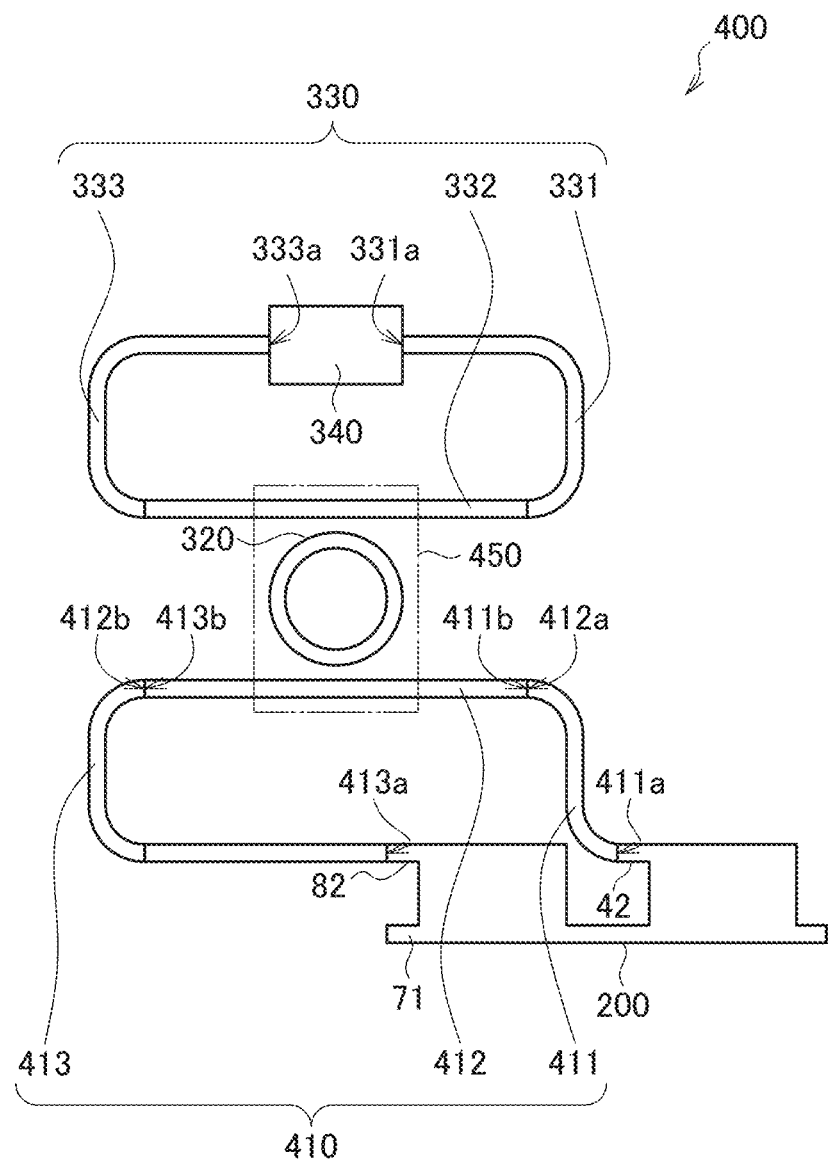
FIG. 15 is a schematic plan view illustrating a second receiving circuit according to an embodiment of the present invention.

A receiving circuit (hereinafter also referred to as a second receiving circuit) according to a fourth embodiment of the present invention will be described with reference to FIG. 15. FIG. 15 is a schematic plan view illustrating the second receiving circuit. In FIG. 15, the support substrate and the cladding are omitted. Also, because the second receiving circuit includes the above-described second optical waveguide element 200 (refer to FIG. 11), the second optical waveguide element 200 is illustrated in a simplified manner, and the common structural elements will be denoted by the same reference numerals, and description thereof will be omitted. Further, the same structural elements as those of the first receiving circuit 300 described above will be denoted by the same reference numerals, and description thereof will be omitted.

In addition to the above-described second optical waveguide element 200, a second receiving circuit 400 has a front-stage connection waveguide core 410, a ring waveguide core 320, a rear-stage connection waveguide core 330, and a light receiving element 340. The front-stage connection waveguide core 410, the ring waveguide core 320, the rear-stage connection waveguide core 330, and the light receiving element 340 are formed on the support substrate 10 (refer to FIG. 1B) common to the first optical waveguide core 30, the second optical waveguide core 40, the third optical waveguide core 70, and the fourth optical waveguide core 80 of the second optical waveguide element 200 by being included in the common cladding 20 (refer to FIG. 1B).

The front-stage connection waveguide core 410 has a first arm portion 411, a first linear portion 412, and a second arm portion 413 which are connected in series. In addition, a wavelength filter portion 450 is formed by the first linear portion 412, the ring waveguide core 320, and the second linear portion 332 that faces the first linear portion 412 with the ring waveguide core 320 interposed therebetween.

For example, the second receiving circuit 400 is used as a circuit that causes an input optical signal to be aligned to either a TE polarized wave or a TM polarized wave and received by the light receiving element 340. Here, as an example, a configuration example in which an optical signal of a fundamental mode including a TE polarized wave and a TM polarized wave is input from the fourth port portion 71, and in the second optical waveguide element 200, the TE polarized wave of the fundamental mode is not subjected to polarization conversion and is output from the sixth port portion 82, and the TM polarized wave of the fundamental mode is converted into the TE polarized wave of the fundamental mode and is output from the third port portion 42, and the TE polarized wave of the fundamental mode output from the sixth port portion 82 and the third port portion 42 is received by the light receiving element 340 will be described.

In this example, the optical signal including the TE polarized wave or the TM polarized wave of the fundamental mode is input to the fourth port portion 71 of the second optical waveguide element 200. Then, in the second optical waveguide element 200, the TE polarized wave of the fundamental mode included in the optical signal is not subjected to polarization conversion and is output from the sixth port portion 82. The TM polarized wave of the fundamental mode included in the optical signal is converted into the TE polarized wave of the fundamental mode and is output from the third port portion 42.

The TE polarized wave (hereinafter also referred to as a first TE polarized wave in this embodiment) of the fundamental mode output from the third port portion 42 is input to the first arm portion 411 of the front-stage connection waveguide core 410 and is sent to the first linear portion 412. Among the first TE polarized waves propagating through the first linear portion 412, the first TE polarized wave of a specific wavelength is sent to the second linear portion 332 of the rear-stage connection waveguide core 330 via the ring waveguide core 320 in the wavelength filter portion 450. The first TE polarized wave of the specific wavelength sent to the second linear portion 332 is received by the light receiving element 340 via the third arm portion 331.

On the other hand, the TE polarized wave (hereinafter also referred to as a second TE polarized wave in this embodiment) of the fundamental mode output from the sixth port portion 82 is input to the second arm portion 413 of the front-stage connection waveguide core 410 and is sent to the first linear portion 412. Among the second TE polarized waves propagating through the first linear portion 412, the second TE polarized wave of a specific wavelength is sent to the second linear portion 332 of the rear-stage connection waveguide core 330 via the ring waveguide core 320 in the wavelength filter portion 450. The second TE polarized wave of the specific wavelength sent to the second linear portion 332 is received by the light receiving element 340 via the fourth arm portion 333.

The front-stage connection waveguide core 410 is made of, for example, Si having a higher refractive index than the cladding. As a result, the front-stage connection waveguide core 410 functions as a light transmission path, and input light propagates in a propagation direction corresponding to the planar shape of the front-stage connection waveguide core 410. To prevent propagating light from escaping to the support substrate, the front-stage connection waveguide core 410 is preferably formed, for example, to be spaced at least 3 μm or more apart from the support substrate.

For example, the first arm portion 411 may be configured by combining a curved waveguide and a linear waveguide. One end 411a of the first arm portion 411 is connected to the third port portion 42 of the second optical waveguide element 200. The other end 411b of the first arm portion 411 is connected to one end 412a of the first linear portion 412. The first arm portion 411 is formed with a thickness and a width that satisfies a single mode condition for at least the TE polarized wave. Therefore, the first arm portion 411 propagates the TE polarized wave of the fundamental mode.

The first linear portion 412 may be configured as a linear waveguide. The first linear portion 412 is formed with a thickness and a width that satisfies a single mode condition for at least the TE polarized wave. Therefore, the first linear portion 412 propagates the TE polarized wave of the fundamental mode.

For example, the second arm portion 413 may be configured by combining a curved waveguide and a linear waveguide. One end 413a of the second arm portion 413 is connected to the sixth port portion 82 of the second optical waveguide element 200. The other end 413b of the second arm portion 413 is connected to the other end 412b of the first linear portion 412. The second arm portion 413 is formed with a thickness and a width that satisfies a single mode condition for at least the TE polarized wave. Therefore, the second arm portion 413 propagates the TE polarized wave of the fundamental mode.

Because the ring waveguide core 320, the rear-stage connection waveguide core 330, and the light receiving element 340 are the same as the first receiving circuit 300 described above, description thereof will be omitted.

In the second receiving circuit 400, the wavelength filter portion 450 as a ring resonator is formed by the first linear portion 412, the ring waveguide core 320, and the second linear portion 332 opposite to the first linear portion 412 with the ring waveguide core 320 interposed therebetween. In the wavelength filter portion 450, among the TE polarized waves of the fundamental mode propagating through the first linear portion 412, the TE polarized wave of the fundamental mode of a specific wavelength according to the length of the circumference of the ring waveguide core 320 is transitioned to the second linear portion 332 of the rear-stage connection waveguide core 330.

Since the second receiving circuit 400 described above has the second optical waveguide element 200 having the polarization separating function and the polarization rotating function, light may be aligned to either the TE polarized wave or the TM polarized wave and received by the light receiving element 340. By using the first optical waveguide element 200, the second receiving circuit 400 is less susceptible to manufacturing error and can be easily manufactured. In the second optical waveguide element 200, because the TE polarized wave that is not to be subjected to polarization conversion is not input to the first Bragg reflector 34 (refer to FIG. 11), a decrease in the transmission component in the grating of the first Bragg reflector 34 can be prevented. Therefore, the light receiving element 340 can receive light while loss of an input optical signal is suppressed.

Here, the configuration in which the TE polarized wave of the fundamental mode is output from the sixth port portion 82 and the TE polarized wave of the fundamental mode is output from the third port portion 42 has been described. However, the second receiving circuit 400 is not limited to this configuration. According to design of the second optical waveguide element 200, a configuration in which a TE polarized wave of an $r^{th}$-order mode is output from the sixth port portion 82 and a TE polarized wave of an $m^{th}$-order mode is output from the third port portion 42 or a configuration in which a TM polarized wave of an $r^{th}$-order mode is output from the sixth port portion 82 and a TM polarized wave of an $m^{th}$-order mode is output from the third port portion 42 can be used. In this case, the front-stage connection waveguide core 410, the ring waveguide core 320, and the rear-stage connection waveguide core 330 may be designed in accordance with a polarized wave and mode order output from the sixth port portion 82 and the third port portion 42.

When the mode order is different between light output from the sixth port portion 82 and light output from the third port portion 42, two ring waveguide cores 320 designed according to respective order modes may be formed in parallel between the first linear portion 412 and the second linear portion 332, and a plurality of wavelength filter portions 450 may be configured.

Here, although the configuration example in which a ring resonator is used as the wavelength filter portion 450 has been described, the wavelength filter portion 350 is not limited to a ring resonator. For example, other wavelength filters such as a Mach-Zehnder interferometer may also be used as the wavelength filter portion 450.

Figure 16:
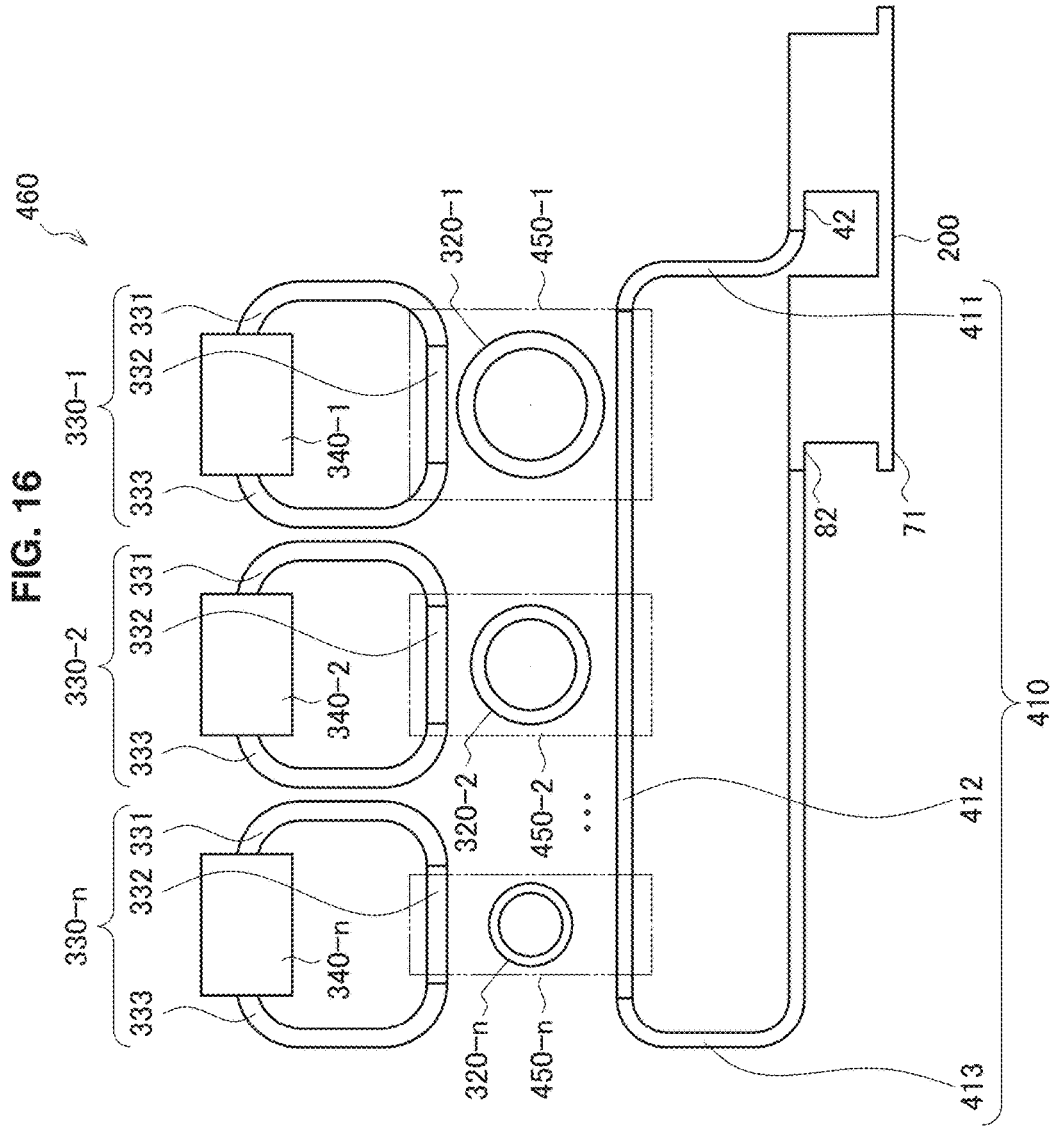
FIG. 16 is a schematic plan view illustrating a modified example of the second receiving circuit according to an embodiment of the present invention.

Like the first receiving circuit, the second receiving circuit may also be configured as a modified example to extract a plurality of different specific wavelengths from light output from the sixth port portion 82 and the third port portion 42. The configuration in such a case is illustrated in FIG. 16. FIG. 16 is a schematic plan view illustrating a modified example of the second receiving circuit. In FIG. 16, the support substrate and the cladding are omitted.

In a second receiving circuit 460 according to the modified example, a plurality of ring waveguide cores 320-1 to 320-$n$ having different circumferential lengths are formed in parallel. In the second receiving circuit 460 according to the modified example, a plurality of rear-stage connection waveguide cores 330-1 to 330-$n$ are formed in one-to-one correspondence with the ring waveguide cores 320-1 to 320-$n$, respectively. Therefore, in the second receiving circuit 460 according to the modified example, a plurality of wavelength filter portions 450-1 to 450-$n$ are provided. The wavelength filter portions 450-1 to 450-$n$ are connected to different light receiving elements 340-1 to 340-$n$ by the rear-stage connection waveguide cores 330-1 to 330-$n$.

Since the second receiving circuit 460 according to the modified example includes the plurality of ring waveguide cores 320-1 320-$n$ having different circumferential lengths, the plurality of rear-stage connection waveguide cores 330-1 to 330-$n$, and the plurality of light receiving elements 340-1 to 340-$n$ as described above, light of a specific wavelength according to the circumferential length of each of the ring waveguide cores 320-1 to 320-$n$ among light propagating through the first linear portion 413 is transitioned to the second linear portion 332 of the rear-stage connection waveguide cores 330-1 to 330-$n$ in each of the wavelength filter portions 450-1 to 450-$n$. Therefore, in the second receiving circuit 460 according to the modified example, light of a plurality of different specific wavelengths can be received by the different light receiving elements 340-1 to 340-$n$ for each wavelength.

(Third Receiving Circuit)

Figure 17:
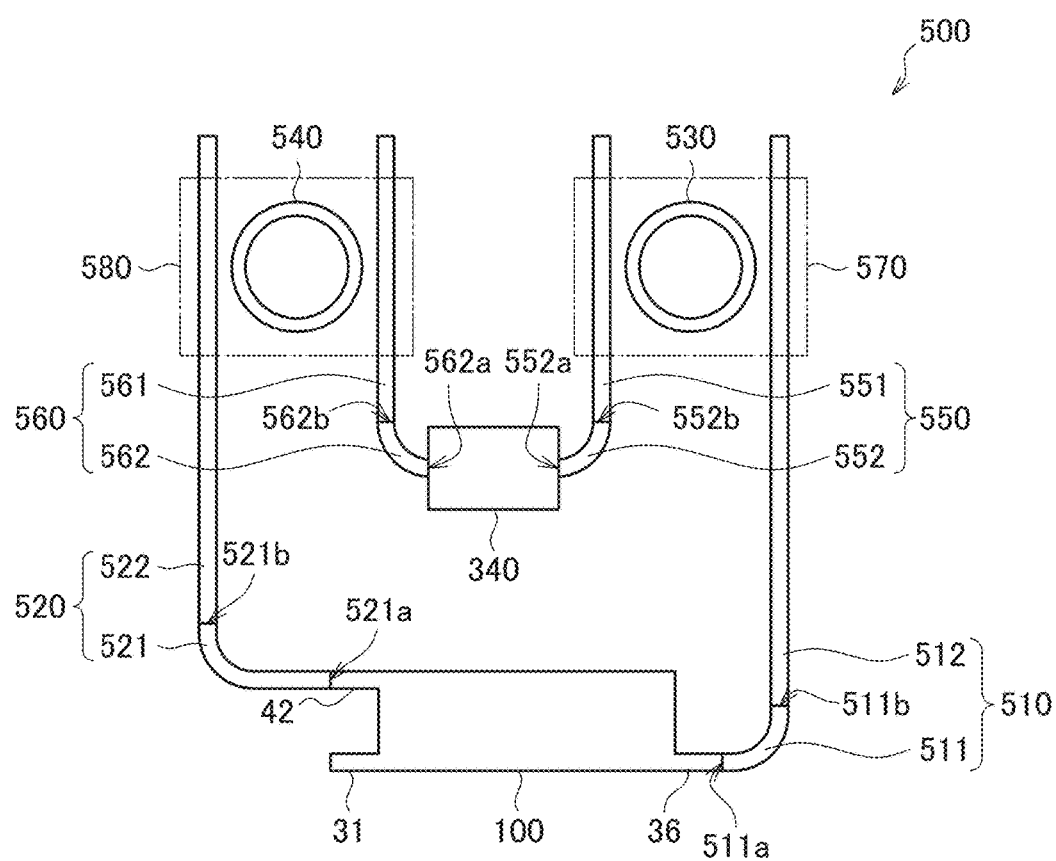
FIG. 17 is a schematic plan view illustrating a third receiving circuit according to an embodiment of the present invention.

A receiving circuit (hereinafter also referred to as a third receiving circuit) according to a fifth embodiment of the present invention will be described with reference to FIG. 17. FIG. 17 is a schematic plan view illustrating the third receiving circuit. In FIG. 17, the support substrate and the cladding are omitted. Also, because the third receiving circuit includes the above-described first optical waveguide element 100 (refer to FIGS. 1A and 1B), the first optical waveguide element 100 is illustrated in a simplified manner, and the common structural elements will be denoted by the same reference numerals, and description thereof will be omitted. Further, the same structural elements as those of the first receiving circuit 300 described above will be denoted by the same reference numerals, and description thereof will be omitted.

In addition to the first optical waveguide element 100 described above, a third receiving circuit 500 has a first front-stage connection waveguide core 510, a second front-stage connection waveguide core 520, a first ring waveguide core 530, a second ring waveguide core 540, a first rear-stage connection waveguide core 550, a second rear-stage connection waveguide core 560, and the light receiving element 340. The first front-stage connection waveguide core 510, the second front-stage connection waveguide core 520, the first ring waveguide core 530, the second ring waveguide core 540, the first rear-stage connection waveguide core 550, the second rear-stage connection waveguide core 560, and the light receiving element 340 are formed on the support substrate 10 (refer to FIG. 1B) common to the first optical waveguide core 30 and the second optical waveguide core 40 of the first optical waveguide element 100 by being included in the common cladding 20 (refer to FIG. 1B).

The first front-stage connection waveguide core 510 has a first arm portion 511 and a first linear portion 512 which are connected in series. The second front-stage connection waveguide core 520 has a second arm portion 521 and a second linear portion 522 which are connected in series. The first rear-stage connection waveguide core 550 has a third linear portion 551 and a third arm portion 552 which are connected in series. The second rear-stage connection waveguide core 560 has a fourth linear portion 561 and a fourth arm portion 562 which are connected in series. A first wavelength filter portion 570 is configured by the first linear portion 512, the first ring waveguide core 530, and the third linear portion 551 that faces the first linear portion 512 with the first ring waveguide core 530 interposed therebetween. A second wavelength filter portion 580 is configured by the second linear portion 522, the second ring waveguide core 540, and the fourth linear portion 561 that faces the second linear portion 522 with the second ring waveguide core 540 interposed therebetween.

For example, the third receiving circuit 500 is used as a circuit that causes an input optical signal to be aligned to either a TE polarized wave or a TM polarized wave and received by the light receiving element 340. Here, as an example, a configuration example in which an optical signal of a fundamental mode including a TE polarized wave and a TM polarized wave is input from the first port portion 31, and in the first optical waveguide element 100, the TE polarized wave of the fundamental mode is not subjected to polarization conversion and is output from the second port portion 36, and the TM polarized wave of the fundamental mode is converted into the TE polarized wave of the fundamental mode and is output from the third port portion 42, and the TE polarized wave of the fundamental mode output from the second port portion 36 and the third port portion 42 is received by the light receiving element 340 will be described.

In this example, the optical signal including the TE polarized wave or the TM polarized wave of the fundamental mode is input to the first port portion 31 of the first optical waveguide element 100. Then, in the first optical waveguide element 100, the TE polarized wave of the fundamental mode included in the optical signal is not subjected to mode conversion and polarization conversion and is output from the second port portion 36. The TM polarized wave of the fundamental mode included in the optical signal is converted into the TE polarized wave of the fundamental mode and is output from the third port portion 42.

The TE polarized wave (hereinafter also referred to as a first TE polarized wave in this embodiment) of the fundamental mode output from the second port portion 36 is input to the first arm portion 511 of the first front-stage connection waveguide core 510 and is sent to the first linear portion 512. Among the first TE polarized waves propagating through the first linear portion 512, the first TE polarized wave of a specific wavelength is sent to the third linear portion 551 of the first rear-stage connection waveguide core 550 via the first ring waveguide core 530 in the first wavelength filter portion 570. The first TE polarized wave of the specific wavelength sent to the third linear portion 551 is received by the light receiving element 340 via the third arm portion 552.

On the other hand, the TE polarized wave (hereinafter also referred to as a second TE polarized wave in this embodiment) of the fundamental mode output from the third port portion 42 is input to the second arm portion 521 of the second front-stage connection waveguide core 520 and is sent to the second linear portion 522. Among the second TE polarized wave propagating through the second linear portion 522, the second TE polarized wave of a specific wavelength is sent to the fourth linear portion 561 of the second rear-stage connection waveguide core 560 via the second ring waveguide core 540 in the second wavelength filter portion 580. The second TE polarized wave of the specific wavelength sent to the fourth linear portion 561 is received by the light receiving element 340 via the fourth arm portion 562.

The first front-stage connection waveguide core 510, the second front-stage connection waveguide core 520, the first ring waveguide core 530, the second ring waveguide core 540, the first rear-stage connection waveguide core 550, and the second rear-stage connection waveguide core 560 are made of, for example, Si having a higher refractive index than the cladding. As a result, the first front-stage connection waveguide core 510, the second front-stage connection waveguide core 520, the first ring waveguide core 530, the second ring waveguide core 540, the first rear-stage connection waveguide core 550, and the second rear-stage connection waveguide core 560 function as light transmission paths, and input light propagates in a propagation direction corresponding to their planar shapes.

To prevent propagating light from escaping to the support substrate, the first front-stage connection waveguide core 510, the second front-stage connection waveguide core 520, the first ring waveguide core 530, the second ring waveguide core 540, the first rear-stage connection waveguide core 550, and the second rear-stage connection waveguide core 560 are preferably formed, for example, to be spaced at least 3 µm or more apart from the support substrate.

For example, the first arm portion 511 may be configured by combining a curved waveguide and a linear waveguide. One end 511a of the first arm portion 511 is connected to the second port portion 36 of the first optical waveguide element 100. The other end 511b of the first arm portion 511 is connected to the first linear portion 512. The first arm portion 511 is formed with a thickness and a width that satisfies a single mode condition for at least the TE polarized wave. Therefore, the first arm portion 511 propagates the TE polarized wave of the fundamental mode.

The first linear portion 512 may be configured as a linear waveguide. The first linear portion 512 is formed with a thickness and a width that satisfies a single mode condition for at least the TE polarized wave. Therefore, the first linear portion 512 propagates the TE polarized wave of the fundamental mode.

The first ring waveguide core 530 may be formed by a ring-shaped waveguide. The first ring waveguide core 530 is provided at a position between the first linear portion 512 and the third linear portion 551 to be separated from each of the first linear portion 512 and the third linear portion 551. A length of a circumference of the first ring waveguide core 530 is designed corresponding to a wavelength extracted with respect to the TE polarized wave of the fundamental mode propagating through the first linear portion 512.

The third linear portion 551 may be configured as a linear waveguide. The third linear portion 551 is formed at a position facing the first linear portion 512 with the first ring waveguide core 530 interposed therebetween. The third linear portion 551 is formed with a thickness and a width that satisfies a single mode condition for at least the TE polarized wave. Therefore, the third linear portion 551 propagates the TE polarized wave of the fundamental mode.

For example, the third arm portion 552 may be configured by a curved waveguide. One end 552a of the third arm portion 552 is connected to the light receiving element 340. The other end 552b of the third arm portion 552 is connected to the third linear portion 551. The third arm portion 552 is formed with a thickness and a width that satisfies a single mode condition for at least the TE polarized wave. Therefore, the third arm portion 552 propagates the TE polarized wave of the fundamental mode.

For example, the second arm portion 521 may be configured by combining a curved waveguide and a linear waveguide. One end 521a of the second arm portion 521 is connected to the third port portion 42 of the first optical waveguide element 100. The other end 521b of the second arm portion 521 is connected to the second linear portion 522. The second arm portion 521 is formed with a thickness and a width that satisfies a single mode condition for at least the TE polarized wave. Therefore, the second arm portion 521 propagates the TE polarized wave of the fundamental mode.

The second linear portion 522 may be configured as a linear waveguide. The second linear portion 522 is formed with a thickness and a width that satisfies a single mode condition for at least the TE polarized wave. Therefore, the second linear portion 522 propagates the TE polarized wave of the fundamental mode.

The second ring waveguide core 540 may be formed by a ring-shaped waveguide. The second ring waveguide core 540 is provided at a position between the second linear portion 522 and the fourth linear portion 561 to be separated from each of the second linear portion 522 and the fourth linear portion 561. A length of a circumference of the second ring waveguide core 540 is designed corresponding to a wavelength extracted with respect to the TE polarized wave of the fundamental mode propagating through the second linear portion 522.

The fourth linear portion 561 may be configured as a linear waveguide. The fourth linear portion 561 is formed at a position facing the second linear portion 522 with the second ring waveguide core 540 interposed therebetween. The fourth linear portion 561 is formed with a thickness and a width that satisfies a single mode condition for at least the TE polarized wave. Therefore, the fourth linear portion 561 propagates the TE polarized wave of the fundamental mode.

For example, the fourth arm portion 562 may be configured by a curved waveguide. One end 562a of the fourth arm portion 562 is connected to the light receiving element 340 at a side facing the third arm portion 552. The other end 562b of the fourth arm portion 562 is connected to the fourth linear portion 561. The fourth arm portion 562 is formed with a thickness and a width that satisfies a single mode condition for at least the TE polarized wave. Therefore, the fourth arm portion 562 propagates the TE polarized wave of the fundamental mode.

Because the light receiving element 340 is the same as the first receiving circuit 300 described above, description thereof will be omitted.

In the third receiving circuit 500, the first wavelength filter portion 570 as a ring resonator is formed by the first linear portion 512, the first ring waveguide core 530, and the third linear portion 551 opposite to the first linear portion 512 with the first ring waveguide core 530 interposed therebetween. In the first wavelength filter portion 570, among the TE polarized waves of the fundamental mode propagating through the first linear portion 512, the TE polarized wave of the fundamental mode of a specific wavelength according to the length of the circumference of the first ring waveguide core 530 is transitioned to the third linear portion 551 of the first rear-stage connection waveguide core 550.

In addition, in the third receiving circuit 500, the second wavelength filter portion 580 as a ring resonator is formed by the second linear portion 522, the second ring waveguide core 540, and the fourth linear portion 561 opposite to the second linear portion 522 with the second ring waveguide core 540 interposed therebetween. In the second wavelength filter portion 580, among the TE polarized waves of the fundamental mode propagating through the second linear portion 522, the TE polarized wave of the fundamental mode of a specific wavelength according to the length of the circumference of the second ring waveguide core 540 is transitioned to the fourth linear portion 561 of the second rear-stage connection waveguide core 560.

Since third receiving circuit 500 described above has the first optical waveguide element 100 having the polarization separating function and the polarization rotating function, light may be aligned to either the TE polarized wave or the TM polarized wave and received by the light receiving element 340. In addition, by using the first optical waveguide element 100, the third receiving circuit 500 is less susceptible to manufacturing error and can be easily manufactured. In addition, in the third receiving circuit 500, because a loop circuit is not formed at a portion between the second port portion 36 and the third port portion 42, light of a wavelength that is not transitioned to the first rear-stage connection waveguide core 550 and the second rear-stage connection waveguide core 560 in the first wavelength filter portion 570 and the second wavelength filter portion 580 among output light from the second port portion 36 and the third port portion 42 can be prevented from returning to the first optical waveguide element 100 again.

Here, the configuration in which the TE polarized wave of the fundamental mode is output from the second port portion 36 and the TE polarized wave of the fundamental mode is output from the third port portion 42 has been described. However, the third receiving circuit 500 is not limited to this configuration. According to design of the first optical waveguide element 100, a configuration in which a TE polarized wave of a $p^{th}$-order mode is output from the second port portion 36 and a TE polarized wave of an $m^{th}$-order mode is output from the third port portion 42 or a configuration in which a TM polarized wave of a $p^{th}$-order mode is output from the second port portion 36 and a TM polarized wave of an $m^{th}$-order mode is output from the third port portion 42 can be used. In this case, the first front-stage connection waveguide core 510, the second front-stage connection waveguide core 520, the first ring waveguide core 530, the second ring waveguide core 540, the first rear-stage connection waveguide core 550, and the second rear-stage connection waveguide core 560 may be designed in accordance with a polarized wave and mode order output from the second port portion 36 and the third port portion 42.

Here, although the configuration example in which a ring resonator is used as the first wavelength filter portion 570 and the second wavelength filter portion 580 has been described, the first wavelength filter portion 570 and the second wavelength filter portion 580 are not limited to a ring resonator. For example, other wavelength filters such as a Mach-Zehnder interferometer may also be used as the first wavelength filter portion 570 and the second wavelength filter portion 580.

Like the first receiving circuit and the second receiving circuit, the third receiving circuit may be configured as the modified example to extract a plurality of different specific wavelengths from light output from the second port portion 36 and the third port portion 42 and cause the wavelengths to be received by different light receiving elements (not illustrated). In this case, a plurality of first ring waveguide cores 530 having different circumferential lengths are formed in parallel. In addition, a plurality of second ring waveguide cores 540 having different circumferential lengths are formed in parallel. In addition, a plurality of first rear-stage connection waveguide cores 550 are formed in one-to-one correspondence with the first ring waveguide cores 530, and a plurality of second rear-stage connection waveguide cores 560 are formed in one-to-one correspondence with the second ring waveguide cores 540. Therefore, pluralities of first wavelength filter portions 570 and second wavelength filter portions 580 are configured. In addition, the first wavelength filter portions 570 are connected to different light receiving elements 340 by the plurality of first rear-stage connection waveguide cores 550. In addition, the second wavelength filter portions 580 are connected to different light receiving elements 340 by the plurality of second rear-stage connection waveguide cores 560.

By forming the plurality of first ring waveguide cores 530 and second ring waveguide cores 540 having different circumferential lengths, the plurality of first rear-stage connection waveguide cores 550 and second rear-stage connection waveguide cores 560, and the plurality of light receiving elements 340 as described above, in each of the first wavelength filter portions 570 and each of the second wavelength filter portions 580, light of a specific wavelength according to the circumferential length of each of the first ring waveguide cores 530 and each of the second ring waveguide cores 540 is transitioned to corresponding first rear-stage connection waveguide core 550 and second rear-stage connection waveguide core 560. Therefore, light of a plurality of different specific wavelengths can be received by different light receiving elements 340 for each wavelength.

(Fourth Receiving Circuit)

Figure 18:
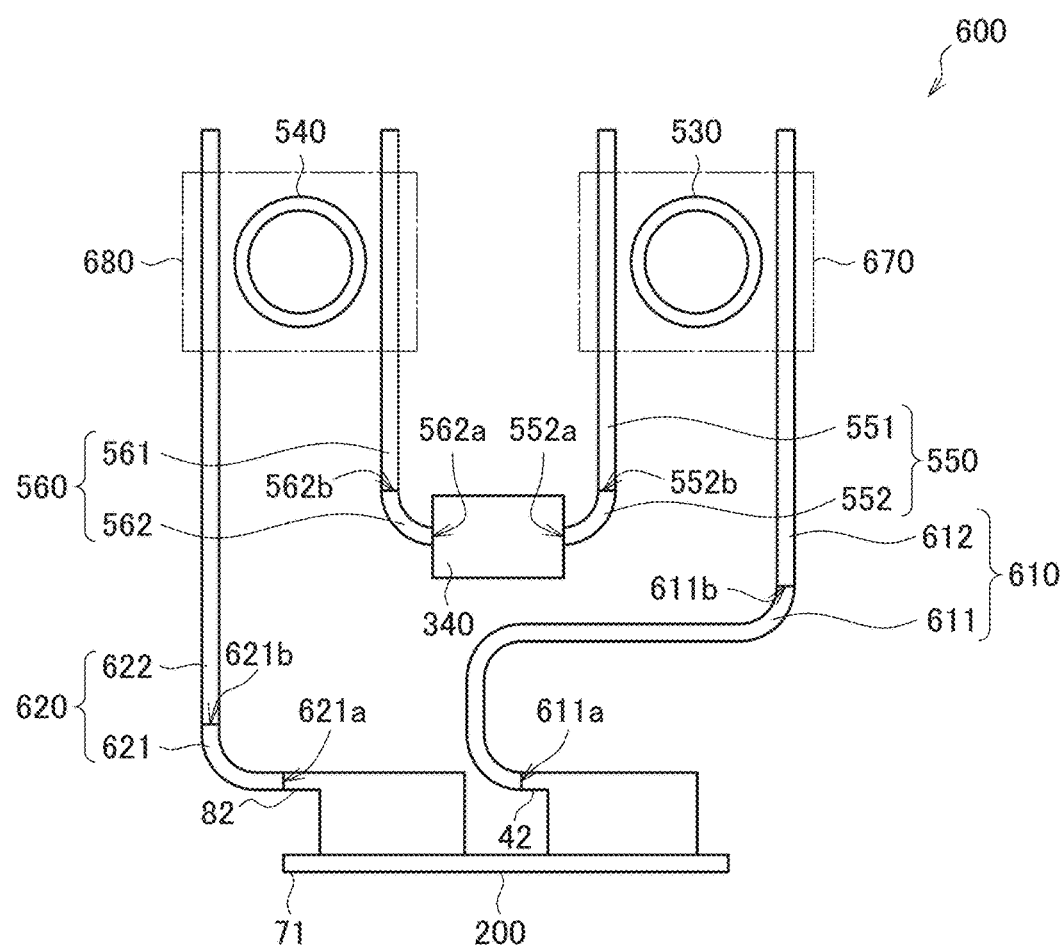
FIG. 18 is a schematic plan view illustrating a fourth receiving circuit according to an embodiment of the present invention.

A receiving circuit (hereinafter also referred to as a fourth receiving circuit) according to a sixth embodiment of the present invention will be described with reference to FIG. 18. FIG. 18 is a schematic plan view illustrating the fourth receiving circuit. In FIG. 18, the support substrate and the cladding are omitted. Also, because the fourth receiving circuit includes the above-described second optical waveguide element 200 (refer to FIG. 11), the second optical waveguide element 200 is illustrated in a simplified manner, and the common structural elements will be denoted by the same reference numerals, and description thereof will be omitted. Further, the same structural elements as those of the third receiving circuit 500 described above will be denoted by the same reference numerals, and description thereof will be omitted.

In addition to the second optical waveguide element 200 described above, the fourth receiving circuit 600 has a first front-stage connection waveguide core 610, a second front-stage connection waveguide core 620, a first ring waveguide core 530, a second ring waveguide core 540, a first rear-stage connection waveguide core 550, a second rear-stage connection waveguide core 560, and the light receiving element 340. The first front-stage connection waveguide core 610, the second front-stage connection waveguide core 620, the first ring waveguide core 530, the second ring waveguide core 540, the first rear-stage connection waveguide core 550, the second rear-stage connection waveguide core 560, and the light receiving element 340 are formed on the support substrate 10 (refer to FIG. 1B) common to the first optical waveguide core 30, the second optical waveguide core 40, the third optical waveguide core 70, and the fourth optical waveguide core 80 of the second optical waveguide element 200 by being included in the common cladding 20 (refer to FIG. 1B).

The first front-stage connection waveguide core 610 has a first arm portion 611 and a first linear portion 612 which are connected in series. The second front-stage connection waveguide core 620 has a second arm portion 621 and a second linear portion 622 which are connected in series. A first wavelength filter portion 670 is configured by the first linear portion 612, the first ring waveguide core 530, and the third linear portion 551 that faces the first linear portion 612 with the first ring waveguide core 530 interposed therebetween. A second wavelength filter portion 680 is configured by the second linear portion 622, the second ring waveguide core 540, and the fourth linear portion 561 that faces the second linear portion 622 with the second ring waveguide core 540 interposed therebetween.

For example, the fourth receiving circuit 600 is used as a circuit that causes an input optical signal to be aligned to either a TE polarized wave or a TM polarized wave and received by the light receiving element 340. Here, as an example, a configuration example in which an optical signal of a fundamental mode including a TE polarized wave and a TM polarized wave is input from the fourth port portion 71, and in the second optical waveguide element 200, the TE polarized wave of the fundamental mode is not subjected to polarization conversion and is output from the sixth port portion 82, and the TM polarized wave of the fundamental mode is converted into the TE polarized wave of the fundamental mode and is output from the third port portion 42, and the TE polarized wave of the fundamental mode output from the sixth port portion 82 and the third port portion 42 is received by the light receiving element 340 will be described.

In this example, the optical signal including the TE polarized wave or the TM polarized wave of the fundamental mode is input to the fourth port portion 71 of the second optical waveguide element 200. Then, in the second optical waveguide element 200, the TE polarized wave of the fundamental mode included in the optical signal is not subjected to polarization conversion and is output from the sixth port portion 82. The TM polarized wave of the fundamental mode included in the optical signal is converted into the TE polarized wave of the fundamental mode and is output from the third port portion 42.

The TE polarized wave (hereinafter also referred to as a first TE polarized wave in this embodiment) of the fundamental mode output from the third port portion 42 is input to the first arm portion 611 of the first front-stage connection waveguide core 610 and is sent to the first linear portion 612. Among the first TE polarized waves propagating through the first linear portion 612, the first TE polarized wave of a specific wavelength is sent to the third linear portion 551 of the first rear-stage connection waveguide core 550 via the first ring waveguide core 530 in the first wavelength filter portion 670. The first TE polarized wave of the specific wavelength sent to the third linear portion 551 is received by the light receiving element 340 via the third arm portion 552.

On the other hand, the TE polarized wave (hereinafter also referred to as a second TE polarized wave in this embodiment) of the fundamental mode output from the sixth port portion 82 is input to the second arm portion 621 of the second front-stage connection waveguide core 620 and is sent to the second linear portion 622. Among the second TE polarized wave propagating through the second linear portion 622, the second TE polarized wave of a specific wavelength is sent to the fourth linear portion 561 of the second rear-stage connection waveguide core 560 via the second ring waveguide core 540 in the second wavelength filter portion 680. The second TE polarized wave of the specific wavelength sent to the fourth linear portion 561 is received by the light receiving element 340 via the fourth arm portion 562.

The first front-stage connection waveguide core 610 and the second front-stage connection waveguide core 620 are made of, for example, Si having a higher refractive index than the cladding. As a result, the first front-stage connection waveguide core 610 and the second front-stage connection waveguide core 620 function as light transmission paths, and input light propagates in a propagation direction corresponding to their planar shapes.

To prevent propagating light from escaping to the support substrate, the first front-stage connection waveguide core 610 and the second front-stage connection waveguide core 620 are preferably formed, for example, to be spaced at least 3 μm or more apart from the support substrate.

For example, the first arm portion 611 may be configured by combining a curved waveguide and a linear waveguide. One end 611a of the first arm portion 611 is connected to the third port portion 42 of the second optical waveguide element 200. The other end 611b of the first arm portion 611 is connected to the first linear portion 612. The first arm portion 611 is formed with a thickness and a width that satisfies a single mode condition for at least the TE polarized wave. Therefore, the first arm portion 611 propagates the TE polarized wave of the fundamental mode.

The first linear portion 612 may be configured as a linear waveguide. The first linear portion 612 is formed with a thickness and a width that satisfies a single mode condition for at least the TE polarized wave. Therefore, the first linear portion 612 propagates the TE polarized wave of the fundamental mode.

For example, the second arm portion 621 may be configured by combining a curved waveguide and a linear waveguide. One end 621a of the second arm portion 621 is connected to the sixth port portion 82 of the second optical waveguide element 200. The other end 621b of the second arm portion 621 is connected to the second linear portion 622. The second arm portion 621 is formed with a thickness and a width that satisfies a single mode condition for at least the TE polarized wave. Therefore, the second arm portion 621 propagates the TE polarized wave of the fundamental mode.

The second linear portion 622 may be configured as a linear waveguide. The second linear portion 622 is formed with a thickness and a width that satisfies a single mode condition for at least the TE polarized wave. Therefore, the second linear portion 622 propagates the TE polarized wave of the fundamental mode.

The first ring waveguide core 530, the second ring waveguide core 540, the first rear-stage connection waveguide core 550, the second rear-stage connection waveguide core 560, and the light receiving element 340 are the same as the first receiving circuit 300 described above, description thereof will be omitted.

In the fourth receiving circuit 600, the first wavelength filter portion 670 as a ring resonator is formed by the first linear portion 612, the first ring waveguide core 530, and the third linear portion 551 opposite to the first linear portion 612 with the first ring waveguide core 530 interposed therebetween. In the first wavelength filter portion 670, among the TE polarized waves of the fundamental mode propagating through the first linear portion 612, the TE polarized wave of the fundamental mode of a specific wavelength according to the length of the circumference of the first ring waveguide core 530 is transitioned to the third linear portion 551 of the first rear-stage connection waveguide core 550.

In addition, in the fourth receiving circuit 600, the second wavelength filter portion 680 as a ring resonator is formed by the second linear portion 622, the second ring waveguide core 540, and the fourth linear portion 561 opposite to the second linear portion 622 with the second ring waveguide core 540 interposed therebetween. In the second wavelength filter portion 680, among the TE polarized waves of the fundamental mode propagating through the second linear portion 622, the TE polarized wave of the fundamental mode of a specific wavelength according to the length of the circumference of the second ring waveguide core 540 is transitioned to the fourth linear portion 561 of the second rear-stage connection waveguide core 560.

Since fourth receiving circuit 600 described above has the second optical waveguide element 200 having the polarization separating function and the polarization rotating function, light may be aligned to either the TE polarized wave or the TM polarized wave and received by the light receiving element 340. In addition, by using the second optical waveguide element 200, the fourth receiving circuit 600 is less susceptible to manufacturing error and can be easily manufactured. In addition, in the fourth receiving circuit 600, because a loop circuit is not formed at a portion between the third port portion 42 and the sixth port portion 82, light of a wavelength that is not transitioned to the first rear-stage connection waveguide core 550 and the second rear-stage connection waveguide core 560 in the first wavelength filter portion 670 and the second wavelength filter portion 680 among output light from the third port portion 42 and the sixth port portion 82 can be prevented from returning to the second optical waveguide element 200 again. In the second optical waveguide element 200, because the TE polarized wave that is not to be subjected to polarization conversion is not input to the first Bragg reflector 34 (refer to FIG. 11), a decrease in the transmission component in the grating of the first Bragg reflector 34 can be prevented. Therefore, the light receiving element 340 can receive light while loss of an input optical signal is suppressed.

Here, the configuration in which the TE polarized wave of the fundamental mode is output from the sixth port portion 82 and the TE polarized wave of the fundamental mode is output from the third port portion 42 has been described. However, the fourth receiving circuit 600 is not limited to this configuration. According to design of the second optical waveguide element 200, a configuration in which a TE polarized wave of an $r^{th}$-order mode is output from the sixth port portion 82 and a TE polarized wave of an $m^{th}$-order mode is output from the third port portion 42 or a configuration in which a TM polarized wave of an $r^{th}$-order mode is output from the sixth port portion 82 and a TM polarized wave of an $m^{th}$-order mode is output from the third port portion 42 can be used. In this case, the first front-stage connection waveguide core 610, the second front-stage connection waveguide core 620, the first ring waveguide core 530, the second ring waveguide core 540, the first rear-stage connection waveguide core 550, and the second rear-stage connection waveguide core 560 may be designed in accordance with a polarized wave and mode order output from the third port portion 42 and the sixth port portion 82.

Here, although the configuration example in which a ring resonator is used as the first wavelength filter portion 670 and second wavelength filter portion 680 has been described, the first wavelength filter portion 670 and second wavelength filter portion 680 are not limited to a ring resonator. For example, other wavelength filters such as a Mach-Zehnder interferometer may also be used as the first wavelength filter portion 670 and second wavelength filter portion 680.

Like the first receiving circuit, the second receiving circuit, and the third receiving circuit, the fourth receiving circuit may be configured as the modified example to extract a plurality of different specific wavelengths from light output from the third port portion 42 and the sixth port portion 82 and cause the wavelengths to be received by different light receiving elements (not illustrated). In this case, a plurality of first ring waveguide cores 530 having different circumferential lengths are formed in parallel. In addition, a plurality of second ring waveguide cores 540 having different circumferential lengths are formed in parallel. In addition, a plurality of first rear-stage connection waveguide cores 550 are formed in one-to-one correspondence with the first ring waveguide cores 530, and a plurality of second rear-stage connection waveguide cores 560 are formed in one-to-one correspondence with the second ring waveguide cores 540. Therefore, pluralities of first wavelength filter portions 670 and second wavelength filter portions 680 are configured. In addition, the first wavelength filter portions 670 are connected to different light receiving elements 340 by the plurality of first rear-stage connection waveguide cores 550. In addition, the second wavelength filter portions 680 are connected to different light receiving elements 340 by the plurality of second rear-stage connection waveguide cores 560.

By forming the plurality of first ring waveguide cores 530 and second ring waveguide cores 540 having different circumferential lengths, the plurality of first rear-stage connection waveguide cores 550 and second rear-stage connection waveguide cores 560, and the plurality of light receiving elements 340 as described above, in each of the first wavelength filter portions 670 and each of the second wavelength filter portions 680, light of a specific wavelength according to the circumferential length of each of the first ring waveguide cores 530 and each of the second ring waveguide cores 540 is transitioned to corresponding first rear-stage connection waveguide core 550 and second rear-stage connection waveguide core 560. Therefore, light of a plurality of different specific wavelengths can be received by different light receiving elements 340 for each wavelength.

(Manufacturing Method)

The first optical waveguide element 100, the second optical waveguide element 200, the first receiving circuit 300, the second receiving circuit 400, the third receiving circuit 500, and the fourth receiving circuit 600 which are described above can be simply manufactured by using, for example, a silicon-on-insulator (SOI) substrate. Hereinafter, a manufacturing method of the first optical waveguide element 100 will be described as an example.

First, an SOI substrate configured by a support substrate layer, a $SiO_2$ layer, and a Si layer laminated in that order is prepared. Then, by patterning the Si layer using, for example, an etching technique, the first optical waveguide core 30 and the second optical waveguide core 40 are formed. As a result, a structure in which the $SiO_2$ layer is laminated on the support substrate layer that serves as the support substrate 10 and the first optical waveguide core 30 and the second optical waveguide core 40 are formed on the $SiO_2$ layer can be obtained. Then, for example, by using a chemical vapor deposition (CVD) technique, $SiO_2$ is formed on the $SiO_2$ layer such that $SiO_2$ covers the first optical waveguide core 30 and the second optical waveguide core 40. As a result, the first optical waveguide core 30 and the second optical waveguide core 40 are included by the cladding 20, and the first optical waveguide element 100 can be manufactured.

In a case in which the second optical waveguide element 200 is manufactured, in the above-described process of patterning the Si layer, the third optical waveguide core 70 and the fourth optical waveguide core 80 may be formed in addition to the first optical waveguide core 30 and the second optical waveguide core 40.

In addition, in a case in which the first receiving circuit 300 and the second receiving circuit 400 are manufactured, in the above-described process of patterning the Si layer, optical waveguide layers of the front-stage connection waveguide core 310 or 410, the ring waveguide core 320, the rear-stage connection waveguide core 330, and the light receiving element 340 may be formed in addition to the optical waveguide cores 30, 40, 70, and 80. In a case in which the third receiving circuit 500 and the fourth receiving circuit 600 are manufactured, in the above-described process of patterning the Si layer, optical waveguide layers of the first front-stage connection waveguide core 510 or 610, the second front-stage connection waveguide core 520 or 620, the first ring waveguide core 530, the second ring waveguide core 540, the first rear-stage connection waveguide core 550, the second rear-stage connection waveguide core 560, and the light receiving element 340 may be formed in addition to the optical waveguide cores 30, 40, 70, and 80. In addition, before the cladding 20 is formed, a light absorption layer of the light receiving element 340 may be formed.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. An optical waveguide element comprising:
   a first optical waveguide core; and
   a second optical waveguide core, wherein
   the first optical waveguide core includes
      a first coupling portion configured to propagate any one polarized wave of a TE polarized wave and a TM polarized wave of a $k^{th}$-order mode (k is an integer equal to or larger than 0), another polarized wave of an $h^{th}$-order mode (h is an integer equal to or larger than 0), and another polarized wave of a $p^{th}$-order mode (p is an integer equal to or larger than 0 that is different from h), and
      a first Bragg reflector connected to the first coupling portion,
   the second optical waveguide core includes a second coupling portion,
   the first Bragg reflector includes
      a rib waveguide including a grating configured to convert the any one polarized wave of the $k^{th}$-order mode into the other polarized wave of the $h^{th}$-order mode, reflect the converted polarized wave on the basis of Bragg reflection, and transmit the other polarized wave of the $p^{th}$-order mode, and
      slab waveguides having thicknesses smaller than a thickness of the rib waveguide and integrally formed with the rib waveguide on side surfaces of the rib waveguide respectively, in a light propagation direction,
   a first coupling region in which the first coupling portion and the second coupling portion are spaced apart from each other and arranged in parallel to each other is provided, and
   in the first coupling region, the other polarized wave of the $h^{th}$-order mode propagating through the first coupling portion and another polarized wave of an $m^{th}$-order mode (m is an integer equal to or larger than 0) propagating through the second coupling portion are coupled.

2. The optical waveguide element according to claim 1, further comprising:
   a third optical waveguide core; and
   a fourth optical waveguide core, wherein
   the third optical waveguide core includes
      a third coupling portion configured to propagate the any one polarized wave of the TE polarized wave and the TM polarized wave of the $k^{th}$-order mode (k is an integer equal to or larger than 0), the other polarized wave of the $p^{th}$-order mode (p is an integer equal to or larger than 0), and another polarized wave of a $q^{th}$-order mode (q is an integer equal to or larger than 0 that is different from p), and
      a second Bragg reflector connected to the third coupling portion,
   the fourth optical waveguide core includes a fourth coupling portion,
   the second Bragg reflector includes a grating configured to convert the other polarized wave of the $p^{th}$-order mode into the other polarized wave of the $q^{th}$-order mode, reflect the converted polarized wave on the basis of Bragg reflection, and transmit the any one polarized wave,
   a second coupling region in which the third coupling portion and the fourth coupling portion are spaced apart from each other and arranged in parallel to each other is provided,
   in the second coupling region, the other polarized wave of the $q^{th}$-order mode propagating through the third coupling portion and another polarized wave of an $r^{th}$-order mode (r is an integer equal to or larger than 0) propagating through the fourth coupling portion are coupled, and
   a side of the second Bragg reflector opposite to a side connected to the third coupling portion and a side of the first coupling portion opposite to a side connected to the first Bragg reflector are connected.

3. The optical waveguide element according to claim 1, wherein the grating is formed
   to satisfy $(N_{TEk}+N_{TMh})\Lambda=\lambda$, where $\lambda$ is a Bragg wavelength, $\Lambda$ is a grating period, $N_{TEk}$ is an equivalent refractive index of the $k^{th}$-order mode of the TE polarized wave, and $N_{TMh}$ is an equivalent refractive index of the $h^{th}$-order mode of the TM polarized wave, or
   to satisfy $(N_{TMk}+N_{TEh})\Lambda=\lambda$, where $N_{TMk}$ is an equivalent refractive index of the $k^{th}$-order mode of the TM polarized wave, and $N_{TEh}$ is an equivalent refractive index of the $h^{th}$-order mode of the TE polarized wave.

4. The optical waveguide element according to claim 2, wherein
the grating formed in the rib waveguide is formed
to satisfy $(N_{TEk}+N_{TMh})\Lambda_1=\lambda_1$, where $\lambda_1$ is a Bragg wavelength, $\Lambda_1$ is a grating period, $N_{TEk}$ is an equivalent refractive index of the $k^{th}$-order mode of the TE polarized wave, and $N_{TMh}$ is an equivalent refractive index of the $h^{th}$-order mode of the TM polarized wave, or
to satisfy $(N_{TMk}+N_{TEh})\Lambda_1=\lambda_1$, where $N_{TMk}$ is an equivalent refractive index of the $k^{th}$-order mode of the TM polarized wave, and $N_{TEh}$ is an equivalent refractive index of the $h^{th}$-order mode of the TE polarized wave, and
the grating formed in the second Bragg reflector is formed
to satisfy $(N_{TEp}+N_{TEq})\Lambda_2=\lambda_2$, where $\lambda_2$ is a Bragg wavelength, $\Lambda_2$ is a grating period, $N_{TEp}$ is an equivalent refractive index of the $p^{th}$-order mode of the TE polarized wave, and $N_{TEq}$ is an equivalent refractive index of the $q^{th}$-order mode of the TE polarized wave, or
to satisfy $(N_{TMp}+N_{TMq})\Lambda_2=\lambda_2$, where $N_{TMp}$ is an equivalent refractive index of the $p^{th}$-order mode of the TM polarized wave, and $N_{TMq}$ is an equivalent refractive index of the $q^{th}$-order mode of the TM polarized wave.

5. A receiving circuit comprising:
the optical waveguide element according to claim 1;
a front-stage connection waveguide core;
a wavelength filter portion;
a rear-stage connection waveguide core; and
a light receiving element, wherein
the front-stage connection waveguide core is connected, at one end, to a side of the first Bragg reflector opposite to a side connected to the first coupling portion and is connected, at the other end, to the second coupling portion,
the other polarized wave passing through the first Bragg reflector is input to the one end of the front-stage connection waveguide core, and the other polarized wave propagating through the second coupling portion is input to the other end of the front-stage connection waveguide core,
the wavelength filter portion extracts another polarized wave of a specific wavelength from the other polarized wave propagating through the front-stage connection waveguide core and sends the extracted polarized wave to the rear-stage connection waveguide core, and
the rear-stage connection waveguide core sends the extracted polarized wave of the specific wavelength sent from the wavelength filter portion to the light receiving element.

6. A receiving circuit comprising:
the optical waveguide element according to claim 2;
a front-stage connection waveguide core;
a wavelength filter portion;
a rear-stage connection waveguide core; and
a light receiving element, wherein
the front-stage connection waveguide core is connected, at one end, to the second coupling portion and is connected, at another end, to the fourth connecting portion,
the other polarized wave propagating through the second coupling portion is input from the one end of the front-stage connection waveguide core, and the other polarized wave propagating through the fourth coupling portion is input from the other end of the front-stage connection waveguide core,
the wavelength filter portion extracts another polarized wave of a specific wavelength from another polarized wave propagating through the front-stage connection waveguide core and sends the extracted polarized wave to the rear-stage connection waveguide core, and
the rear-stage connection waveguide core sends the other polarized wave of the specific wavelength sent from the wavelength filter portion to the light receiving element.

7. The receiving circuit according to claim 5, further comprising:
a plurality of the wavelength filter portions; and
a plurality of the light receiving elements, wherein
the wavelength filter portions respectively extract other polarized waves of different specific wavelengths from the other polarized wave propagating through the front-stage connection waveguide core and send the extracted polarized waves to the rear-stage connection waveguide core, and the rear-stage connection waveguide core sends the extracted polarized waves to different light receiving elements for each wavelength.

8. A receiving circuit comprising:
the optical waveguide element according to claim 1;
a first front-stage connection waveguide core;
a second front-stage connection waveguide core;
a first wavelength filter portion;
a second wavelength filter portion;
a first rear-stage connection waveguide core;
a second rear-stage connection waveguide core; and
a light receiving element, wherein
the first front-stage connection waveguide core is connected to a side of the first Bragg reflector opposite to a side connected to the first coupling portion,
the other polarized wave transmitted by the first Bragg reflector is input to the first front-stage connection waveguide core,
the second front-stage connection waveguide core is connected to the second coupling portion,
the other polarized wave propagating through the second coupling portion is input to the second front-stage connection waveguide core,
the first wavelength filter portion extracts another polarized wave of a specific wavelength from the other polarized wave input to the first front-stage connection waveguide core and sends the extracted polarized wave to the first rear-stage connection waveguide core,
the second wavelength filter portion extracts the other polarized wave of the specific wavelength from the other polarized wave input to the second front-stage connection waveguide core and sends the extracted polarized wave to the second rear-stage connection waveguide core,
the first rear-stage connection waveguide core sends the extracted polarized wave of the specific wavelength sent from the first wavelength filter portion to the light receiving element, and
the second rear-stage connection waveguide core sends the extracted polarized wave of the specific wavelength sent from the second wavelength filter portion to the light receiving element.

9. A receiving circuit comprising:
the optical waveguide element according to claim 2;
a first front-stage connection waveguide core;
a second front-stage connection waveguide core;
a first wavelength filter portion;
a second wavelength filter portion;

a first rear-stage connection waveguide core;
a second rear-stage connection waveguide core; and
a light receiving element, wherein
the first front-stage connection waveguide core is connected to the second coupling portion,
the other polarized wave propagating through the second coupling portion is input to the first front-stage connection waveguide core,
the second front-stage connection waveguide core is connected to the fourth coupling portion,
the other polarized wave propagating through the fourth coupling portion is input to the second front-stage connection waveguide core,
the first wavelength filter portion extracts another polarized wave of a specific wavelength from another polarized wave propagating through the first front-stage connection waveguide core and sends the extracted polarized wave to the first rear-stage connection waveguide core,
the second wavelength filter portion extracts the other polarized wave of the specific wavelength from another polarized wave propagating through the second front-stage connection waveguide core and sends the extracted polarized wave to the second rear-stage connection waveguide core,
the first rear-stage connection waveguide core sends the extracted polarized wave of the specific wavelength sent from the first wavelength filter portion to the light receiving element, and
the second rear-stage connection waveguide core sends the extracted polarized wave of the specific wavelength sent from the second wavelength filter portion to the light receiving element.

10. The receiving circuit according to claim 8, further comprising:
a plurality of the first wavelength filter portions,
a plurality of the second wavelength filter portions, and
a plurality of the light receiving elements, wherein
the first wavelength filter portions respectively extract other polarized waves of different specific wavelengths from the other polarized wave input to the first front-stage connection waveguide core and send the extracted polarized waves to the first rear-stage connection waveguide core, and the first rear-stage connection waveguide core sends the extracted polarized waves to different light receiving elements for each wavelength, and
the second wavelength filter portions respectively extract the other polarized waves of different specific wavelengths from the other polarized wave input to through the second front-stage connection waveguide core and send the extracted polarized waves to the second rear-stage connection waveguide core, and the second rear-stage connection waveguide core sends the extracted polarized waves to different light receiving elements for each wavelength.

* * * * *